United States Patent
Katsuki et al.

(10) Patent No.: US 12,491,892 B2
(45) Date of Patent: Dec. 9, 2025

(54) COUPLING ANGLE DETECTION DEVICE FOR COMBINATION VEHICLE, COMBINATION VEHICLE, AND COUPLING ANGLE DETECTION METHOD FOR COMBINATION VEHICLE

(71) Applicant: IHI Corporation, Tokyo (JP)

(72) Inventors: Yoshio Katsuki, Tokyo (JP); Munehiko Maeda, Tokyo (JP)

(73) Assignee: IHI CORPORATION, Tokyo (JP)

( * ) Notice: Subject to any disclaimer, the term of this patent is extended or adjusted under 35 U.S.C. 154(b) by 4 days.

(21) Appl. No.: 18/643,266

(22) Filed: Apr. 23, 2024

(65) Prior Publication Data

US 2024/0270259 A1    Aug. 15, 2024

Related U.S. Application Data

(63) Continuation of application No. PCT/JP2022/040327, filed on Oct. 28, 2022.

(30) Foreign Application Priority Data

Nov. 17, 2021  (JP) .................. 2021-187020

(51) Int. Cl.
    *B60W 40/12*       (2012.01)
(52) U.S. Cl.
    CPC .......... *B60W 40/12* (2013.01); *B60W 2520/22* (2013.01)
(58) Field of Classification Search
    CPC ... B60W 40/12; B60W 2520/22; B62D 13/00; B62D 53/00; G01B 11/26
    See application file for complete search history.

(56) References Cited

U.S. PATENT DOCUMENTS

| | | | |
|---|---|---|---|
| 9,437,055 B2 | 9/2016 | Kuehnle et al. | |
| 9,566,911 B2 | 2/2017 | Greenwood et al. | |
| 11,125,881 B2 | 9/2021 | Chen et al. | |
| 2019/0359134 A1 | 11/2019 | Yamamoto et al. | |
| 2022/0291377 A1* | 9/2022 | Medinei | G01S 15/42 |

FOREIGN PATENT DOCUMENTS

| | | |
|---|---|---|
| JP | 2001-334966 A | 12/2001 |
| JP | 2002-068032 A | 3/2002 |
| JP | 2002-114176 A | 4/2002 |
| JP | 2003-148938 A | 5/2003 |
| JP | 2016-137802 A | 8/2016 |
| JP | 2019-204364 A | 11/2019 |

OTHER PUBLICATIONS

Korean Intellectual Property Office, Official Action, issued in Korean Patent Application No. 10-2024-7016113, which is a counterpart to U.S. Appl. No. 18/643,266, on Sep. 19, 2025, 6 pages.

* cited by examiner

Primary Examiner — Ashley L Redhead, Jr.

(57) ABSTRACT

A coupling angle detection device acquires a shape information of a target member having a prescribed shape and installed in a first vehicle by a shape information acquisition unit installed in a second vehicle and detects an angle formed by a direction specified based on a prescribed condition from the acquired shape information of the target member and a front-rear direction of a vehicle body of the second vehicle that is held, as a coupling angle between the first vehicle and the second vehicle. The target member is installed in the first vehicle such that the specified direction fits a front-rear direction of a vehicle body of the first vehicle.

9 Claims, 17 Drawing Sheets

COUPLING ANGLE DETECTION DEVICE FOR COMBINATION VEHICLE, COMBINATION VEHICLE, AND COUPLING ANGLE DETECTION METHOD FOR COMBINATION VEHICLE

CROSS-REFERENCE TO RELATED APPLICATIONS

The present application is a continuation of International Application No. PCT/JP2022/040327, filed on Oct. 28, 2022, and based upon and claims the benefit of priority from Japanese Patent Application No. 2021-187020, filed on Nov. 17, 2021, the entire contents of which are incorporated herein by reference.

TECHNICAL FIELD

The disclosure relates to a coupling angle detection device for a combination vehicle, a combination vehicle, and a coupling angle detection method for a combination vehicle.

BACKGROUND

A towing motor vehicle, which is a combination vehicle, is used as a vehicle for carrying containers and other loads in large facilities such as port facilities. A towing motor vehicle is a vehicle in which a towing vehicle (trailer head or tractor) and a towed vehicle (chassis) towed by the towing vehicle are coupled with each other by a coupling mechanism. The coupling mechanism of the towing motor vehicle is configured of a coupler provided in the towing vehicle, and a kingpin provided in the towed vehicle.

When a towing motor vehicle configured as above travels to turn in the left or right direction, the coupling angle increases. When the coupling angle increases, the vehicle body tends to roll over, and it also becomes difficult for a driver to grasp the movement area of the vehicle body, and thus the driver needs to drive with extra care. Japanese Unexamined Patent Application Publication No. 2002-114176 proposes to detect a coupling angle between the towing vehicle and the towed vehicle during the travelling of the towing motor vehicle, and to provide driving assistance based on the detected value.

SUMMARY

Japanese Unexamined Patent Application Publication No. 2002-114176 discloses a trailer coupling angle detection device for detecting a coupling angle of a towed vehicle with respect to a towing vehicle by installing a reflector at a prescribed position of the towed vehicle, performing scanning horizontally with respect to the towed vehicle by a scanning radar installed in the towing vehicle, and detecting the direction of reflected light returning from the reflector.

Meanwhile, when using the technology disclosed in Japanese Unexamined Patent Application Publication No. 2002-114176, the intensity of reflected light detected by the scanning radar is attenuated when the distance between the scanning radar and the reflector increases due to a change in the installation position of the reflector or the coupling angle of the towed vehicle. Even when dirt adheres to the reflector, the intensity of reflected light detected by the scanning radar decreases. In such cases, the difference between the intensity of reflected light from the reflector and the intensity of reflected light from the surrounding area thereof decreases, and the scanning radar cannot detect reflected light from the reflector in some cases.

The disclosure is directed to a coupling angle detection device for a combination vehicle, a combination vehicle, and a coupling angle detection method for a combination vehicle with which it is possible to accurately detect a coupling angle between two vehicles constituting a combination vehicle with simple processing.

A coupling angle detection device for a combination vehicle including a first vehicle and a second vehicle coupled to the first vehicle in accordance with an embodiment of the disclosure includes: a target member having a prescribed shape and installed in the first vehicle; a shape information acquisition unit that is installed in the second vehicle and acquires a shape information of the target member; and a coupling angle detection unit that holds in advance, information indicating a front-rear direction of a vehicle body of the second vehicle, recognizes a direction specified based on a prescribed condition from the shape information of the target member acquired by the shape information acquisition unit, as a front-rear direction of a vehicle body of the first vehicle, and detects an angle formed by the front-rear direction of the vehicle body of the second vehicle that is held and the front-rear direction of the vehicle body of the first vehicle that is recognized, as a coupling angle between the first vehicle and the second vehicle. The target member is installed in the first vehicle such that the direction specified based on the prescribed condition from the shape information by the coupling angle detection unit fits the front-rear direction of the vehicle body of the first vehicle.

The target member may include plural entities each having a rectangular shape, the target member may be installed such that each corner of the plural entities in the second vehicle overlaps a line perpendicular to the front-rear direction of the vehicle body of the first vehicle on a plane parallel to a traveling surface of the first vehicle, and the coupling angle detection unit may detect each of the corners from the shape information of each of the plural entities and recognize a direction perpendicular to a straight line connecting each of the detected corners as the front-rear direction of the vehicle body of the first vehicle, thereby detecting the coupling angle.

The target member may have a long rectangular shape, the target member may be installed in the first vehicle such that a long side of the target member overlaps a line perpendicular to the front-rear direction of the vehicle body of the first vehicle on a plane parallel to a traveling surface of the first vehicle, and the coupling angle detection unit may detect the long side from the shape information of the target member and recognize a direction perpendicular to the detected long side as the front-rear direction of the vehicle body of the first vehicle, thereby detecting the coupling angle.

The target member may have a rectangular shape, the target member may be installed in the first vehicle such that one side of the target member overlaps a line perpendicular to the front-rear direction of the vehicle body of the first vehicle on a plane parallel to a traveling surface of the first vehicle, and the coupling angle detection unit may detect the one side from the shape information of the target member and recognize a direction specified based on a position and a direction of the detected one side as the front-rear direction of the vehicle body of the first vehicle, thereby detecting the coupling angle.

The target member may include plural entities each having a circular shape, the target member may be installed such that each center position of circles of the plural entities overlaps a line perpendicular to the front-rear direction of the vehicle body of the first vehicle on a plane parallel to a traveling surface of the first vehicle, and the coupling angle detection unit may detect each center position of the circles from the shape information of each of the plural entities and recognize a direction perpendicular to a straight line connecting each of the detected center positions as the front-rear direction of the vehicle body of the first vehicle, thereby detecting the coupling angle.

A coupling angle detection device for a combination vehicle including a first vehicle and a second vehicle coupled to the first vehicle in accordance with an embodiment of the disclosure includes: a target member having a prescribed shape and installed in the first vehicle; a shape information acquisition unit that is installed in the second vehicle and acquires a shape information of the target member; a rotation angle calculation unit that holds in advance, the shape information of the target member acquired by the shape information acquisition unit when a coupling angle between the first vehicle and the second vehicle is 0°, as a first shape information, acquires the shape information of the target member acquired by the shape information acquisition unit at a given point in time as a second shape information, and calculates a rotation angle between the first shape information and the second shape information based on a position of the shape information acquisition unit; and a coupling angle detection unit that detects a rotation angle calculated by the rotation angle calculation unit, as a coupling angle between the first vehicle and the second vehicle at the given point in time.

A combination vehicle in accordance with an embodiment of the disclosure includes: the coupling angle detection device for a combination vehicle above; and an automatic driving control unit that causes an own vehicle to drive automatically, and changes contents of automatic driving when the coupling angle detected by the coupling angle detection unit has reached a prescribed value or more.

A combination vehicle in accordance with an embodiment of the disclosure includes: the coupling angle detection device for a combination vehicle above; and a notification information output unit that outputs information for notifying a driver that the coupling angle of an own vehicle has reached a prescribed value or more when detecting that the coupling angle detected by the coupling angle detection device has reached a prescribed value or more.

A coupling angle detection method for a combination vehicle in accordance with an embodiment of the disclosure is a method for the combination vehicle including a first vehicle in which a target member having a prescribed shape is installed and a second vehicle coupled to the first vehicle and in which a shape information acquisition unit that acquires a shape information of the target member is installed, the combination vehicle in which the target member is installed being such that a direction specified based on a prescribed condition from the shape information fits a front-rear direction of a vehicle body of the first vehicle. The coupling angle detection method for the combination vehicle includes: holding in advance, information indicating a front-rear direction of a vehicle body of the second vehicle; recognizing a direction specified based on the prescribed condition from the shape information of the target member acquired by the shape information acquisition unit, as a front-rear direction of a vehicle body of the first vehicle; and detecting an angle formed by the front-rear direction of the vehicle body of the second vehicle that is held and the front-rear direction of the vehicle body of the first vehicle that is recognized, as a coupling angle between the first vehicle and the second vehicle.

According to the disclosure, it is possible to accurately detect a coupling angle between two vehicles constituting a combination vehicle with simple processing.

DESCRIPTION OF EMBODIMENTS

Some embodiments of a coupling angle detection device for detecting a coupling angle of a towing motor vehicle, which is a combination vehicle, will be described below with reference to the drawings. A towing motor vehicle is a vehicle in which a towing vehicle (trailer head or tractor) and a towed vehicle (chassis) towed by the towing vehicle are coupled with each other by a coupling mechanism. The coupling mechanism of the towing motor vehicle is configured of a coupler provided in the towing vehicle, and a kingpin provided in the towed vehicle, and the coupling angle (the coupling angle between the towing vehicle and the towed vehicle) changes due to a change in the traveling direction of the towing motor vehicle or the like.

First Embodiment (Configuration of Towing Motor Vehicle 1A Using Coupling Angle Detection Device 30A According to First Embodiment)

Figure 1:
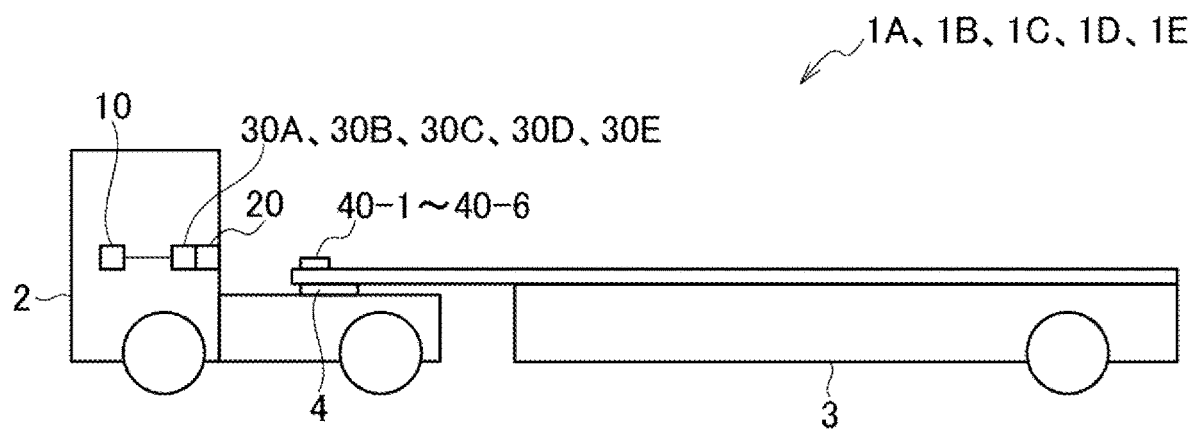
FIG. 1 is a side view illustrating a configuration of a towing motor vehicle in which a coupling angle detection device according to a first embodiment is installed.
Figure 2:
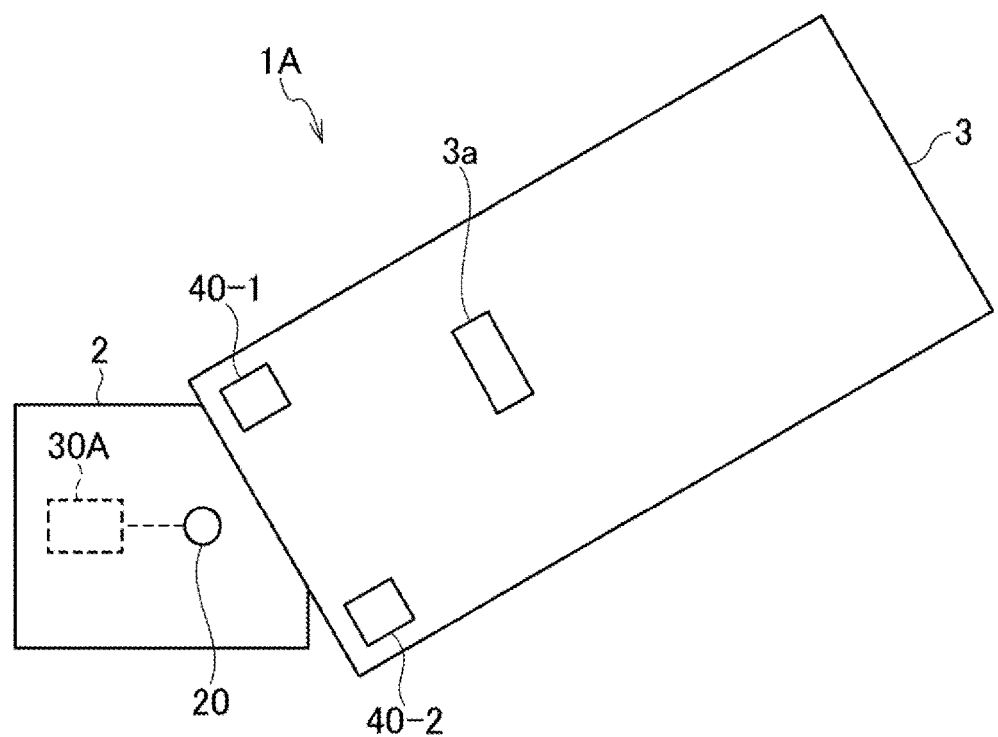
FIG. 2 is a top view of the towing motor vehicle in which the coupling angle detection device according to the first embodiment is installed.

FIG. 1 is a side view illustrating a configuration of a towing motor vehicle 1A using a coupling angle detection device 30A according to the first embodiment. The towing motor vehicle 1A includes a towing vehicle 2, a towed vehicle 3, and a coupling mechanism 4 for coupling the towing vehicle 2 and the towed vehicle 3. A plurality of target members 40-1 and 40-2 are installed at prescribed positions of the towed vehicle 3 serving as a first vehicle. These target members 40-1 and 40-2 are installed in the towed vehicle 3 such that the direction specified based on the prescribed condition from the shape information thereof fits the front-rear direction of the vehicle body of the towed vehicle 3. In the present embodiment, as illustrated in FIG. 2, two identically shaped target members 40-1 and 40-2 are installed at prescribed positions on the upper surface of the towed vehicle 3. The installation positions of the target members 40-1 and 40-2 in the towed vehicle 3 will be described later.

The towing vehicle 2 serving as a second vehicle is provided with a driving control device 10, a sensor (ranging sensor) 20 as a shape information acquisition device, and a coupling angle detection device 30A.

The driving control device 10 controls the driving of the towing vehicle 2. The sensor 20 is configured of, for example, a camera device or a LiDAR (light detection and ranging). The sensor 20 is installed at a prescribed position in the rear of the towing vehicle 2, and measures the distance to a plurality of positions in the objects positioned in the upper surface area of the towed vehicle 3 behind the towing vehicle 2. Hereinafter, the position to be measured by the sensor 20 is described as a measurement point.

Figure 3:
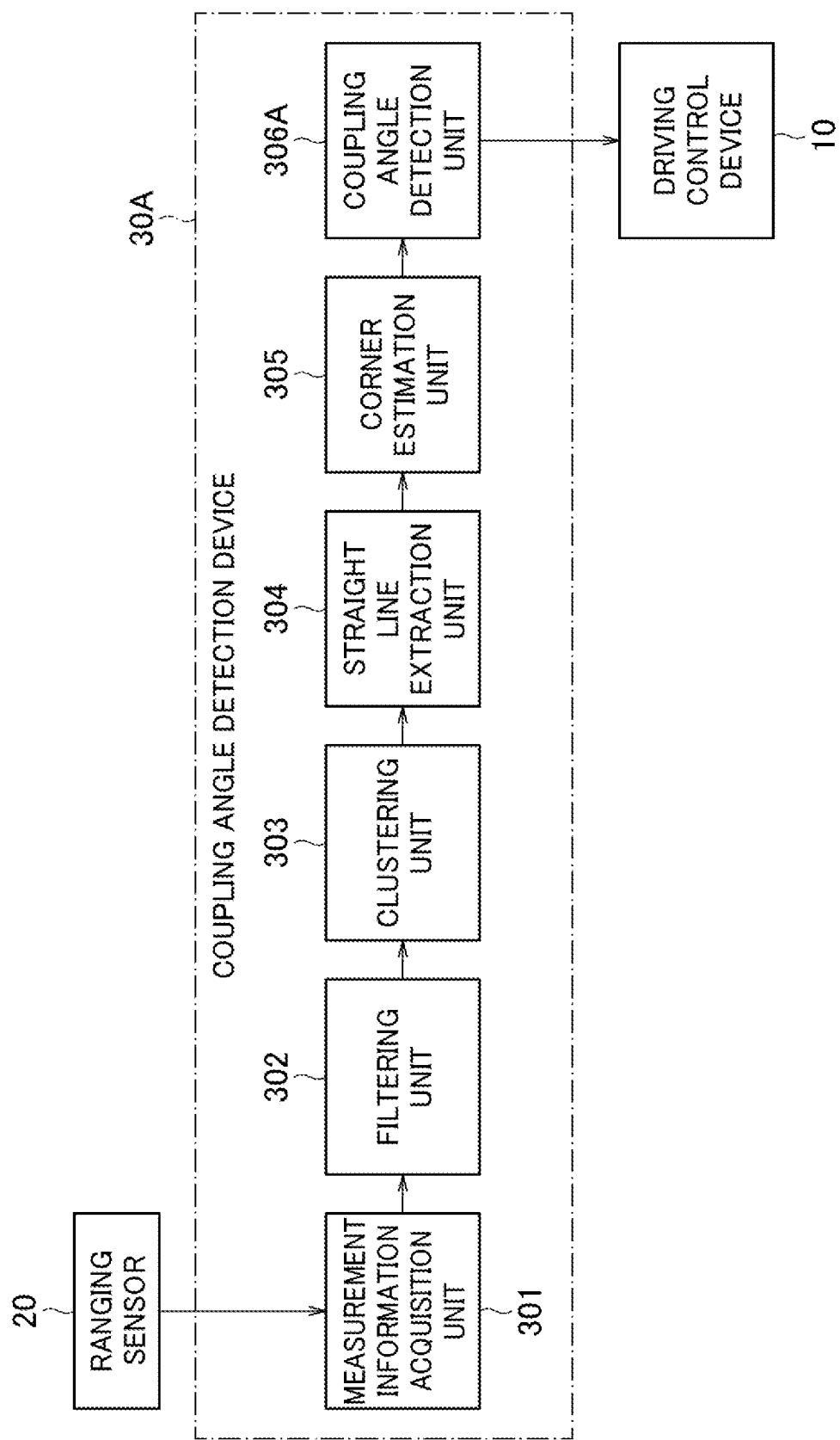
FIG. 3 is a block diagram illustrating a configuration of the coupling angle detection device according to the first embodiment.

FIG. 3 is a block diagram illustrating the configuration of the coupling angle detection device 30A. The coupling angle detection device 30A is communicatively coupled to the driving control device 10 and the sensor 20. The coupling angle detection device 30A includes a measurement information acquisition unit 301, a filtering unit 302, a clustering unit 303, a straight line extraction unit 304, a corner estimation unit 305, and a coupling angle detection unit 306A.

The measurement information acquisition unit 301 acquires information on the ranging distance to a plurality of measurement points and the ranging direction, by means of the sensor 20, as measurement information regarding each measurement point. Of the measurement points corresponding to the measurement information acquired by the measurement information acquisition unit 301, the filtering unit 302 performs filtering processing for the measurement information by extracting information of the measurement points whose ranging distance is within a prescribed range.

Regarding the information of the measurement points extracted by the filtering unit 302, the clustering unit 303 performs clustering processing to recognize a set of measurement points whose distance from adjacent measurement points is less than a prescribed value, as a measurement point group related to one object. The clustering unit 303 calculates the size of each object that is a measurement target, based on the information of the measurement points in the recognized measurement point group. If the calculated size of the object is within a prescribed range corresponding to the target members 40-1 and 40-2, the clustering unit 303 recognizes that the object is the target member 40-1 or 40-2.

The straight line extraction unit 304 extracts information on the straight line portion as shape information constituting the respective target members 40-1 and 40-2, based on the measurement information on the measurement points corresponding to the respective target members 40-1 and 40-2 which are recognized. The corner estimation unit 305 estimates a corner portion which is a corner of each of the target members 40-1 and 40-2, based on the information on the straight line portion extracted by the straight line extraction unit 304.

The coupling angle detection unit 306A recognizes (determines) the front-rear direction of the vehicle body of the towed vehicle 3, based on the straight line connecting an apex of each corner portion of the target members 40-1 and 40-2 estimated by the corner estimation unit 305. The coupling angle detection unit 306A holds information in advance, indicating the front-rear direction of the vehicle body of the towing vehicle 2 with respect to the installation direction of the sensor 20, and detects an angle formed by the front-rear direction of the vehicle body of the towing vehicle 2 as held above and the front-rear direction of the vehicle body of the towed vehicle 3 as recognized above, as a coupling angle of the towing motor vehicle 1A. The coupling angle detection unit 306A transmits the information on the detected coupling angle, to the driving control device 10.

(Operation of Towing Motor Vehicle 1A Using Coupling Angle Detection Device 30A According to First Embodiment)

The operation of the towing motor vehicle 1A using the coupling angle detection device 30A according to the present embodiment will be described below. In the present embodiment, the target members 40-1 and 40-2 have a rectangular shape such as a rectangular parallelepiped. The target members 40-1 and 40-2 are installed in the towed vehicle 3 such that each corner in the towing vehicle 2 overlaps a line perpendicular to the front-rear direction of the vehicle body of the towed vehicle 3 on a plane parallel to the traveling surface of the towing motor vehicle 1A.

During traveling of the towing motor vehicle 1A, the sensor 20 measures the distance to a plurality of measurement points in the objects positioned in the upper surface area of the towed vehicle 3, that is, measures the distance to a plurality of measurement points in the objects including the target members 40-1 and 40-2 at prescribed time intervals. In the present embodiment, the sensor 20 measures the distance to a plurality of measurement points, in the target members 40-1 and 40-2 positioned on the upper surface of the towed vehicle 3 and in a projection member 3a that is a portion of the vehicle body, as illustrated in FIG. 2.

At this time, if the target members 40-1 and 40-2 are formed of thin plate-like members, depending on the coupling angle between the towing vehicle 2 and the towed vehicle 3, the sensor 20 may not be able to detect some end portions of the target members 40-1 and 40-2 at the towing vehicle 2 side as the measurement target positions. However, in the present embodiment, since each of the target members 40-1 and 40-2 is formed of a thick rectangular parallelepiped, the sensor 20 can reliably detect the end portions of the target members 40-1 and 40-2 at the towing vehicle 2 side as the measurement target positions. The sensor 20 transmits the measurement information regarding a plurality of measurement points in the target members 40-1 and 40-2 and in the projection member 3a, to the coupling angle detection device 30A.

Figure 4A:
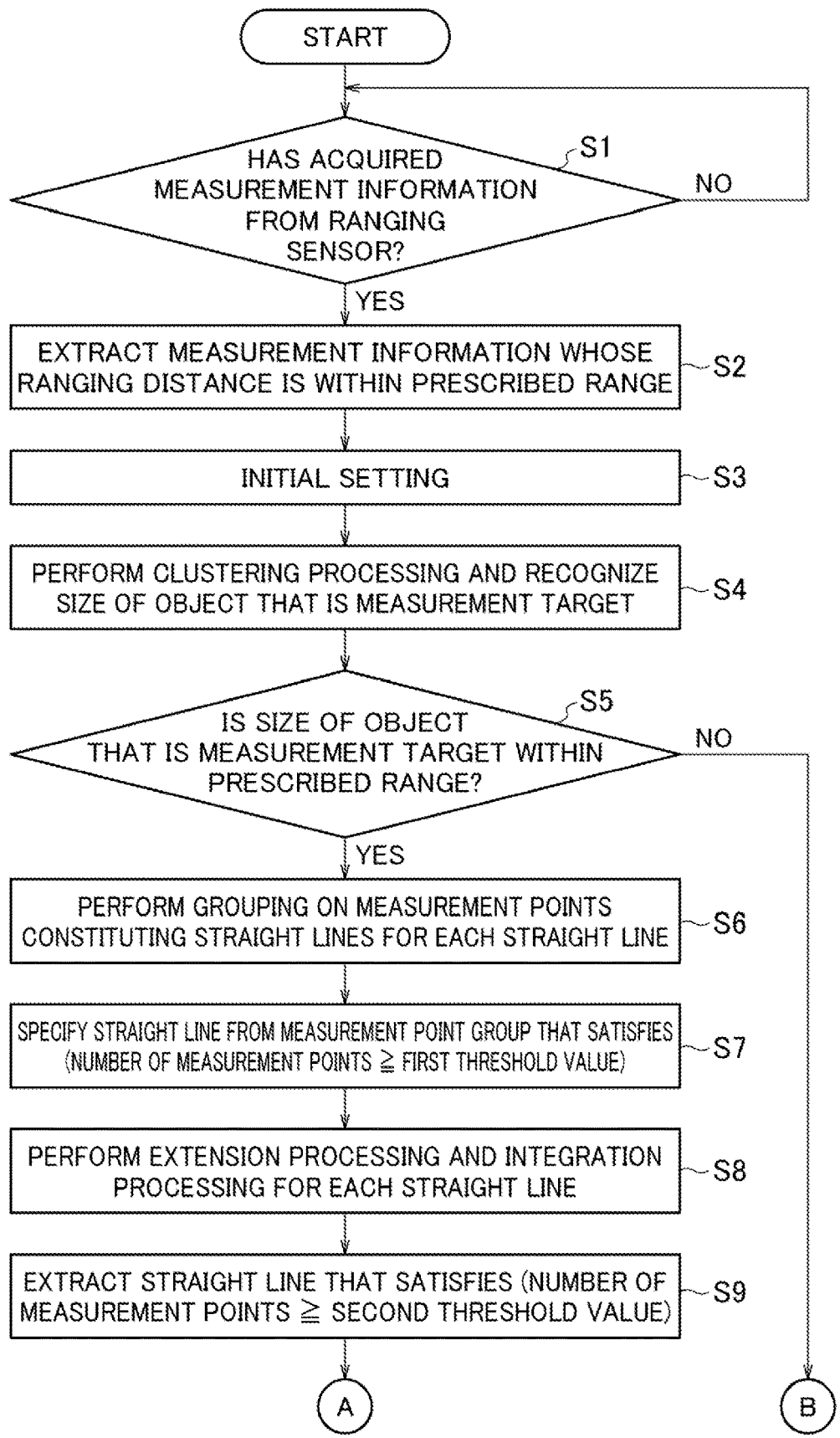
FIG. 4A is a flowchart illustrating a flow of coupling angle detection processing performed by the coupling angle detection device according to the first embodiment.
Figure 4B:
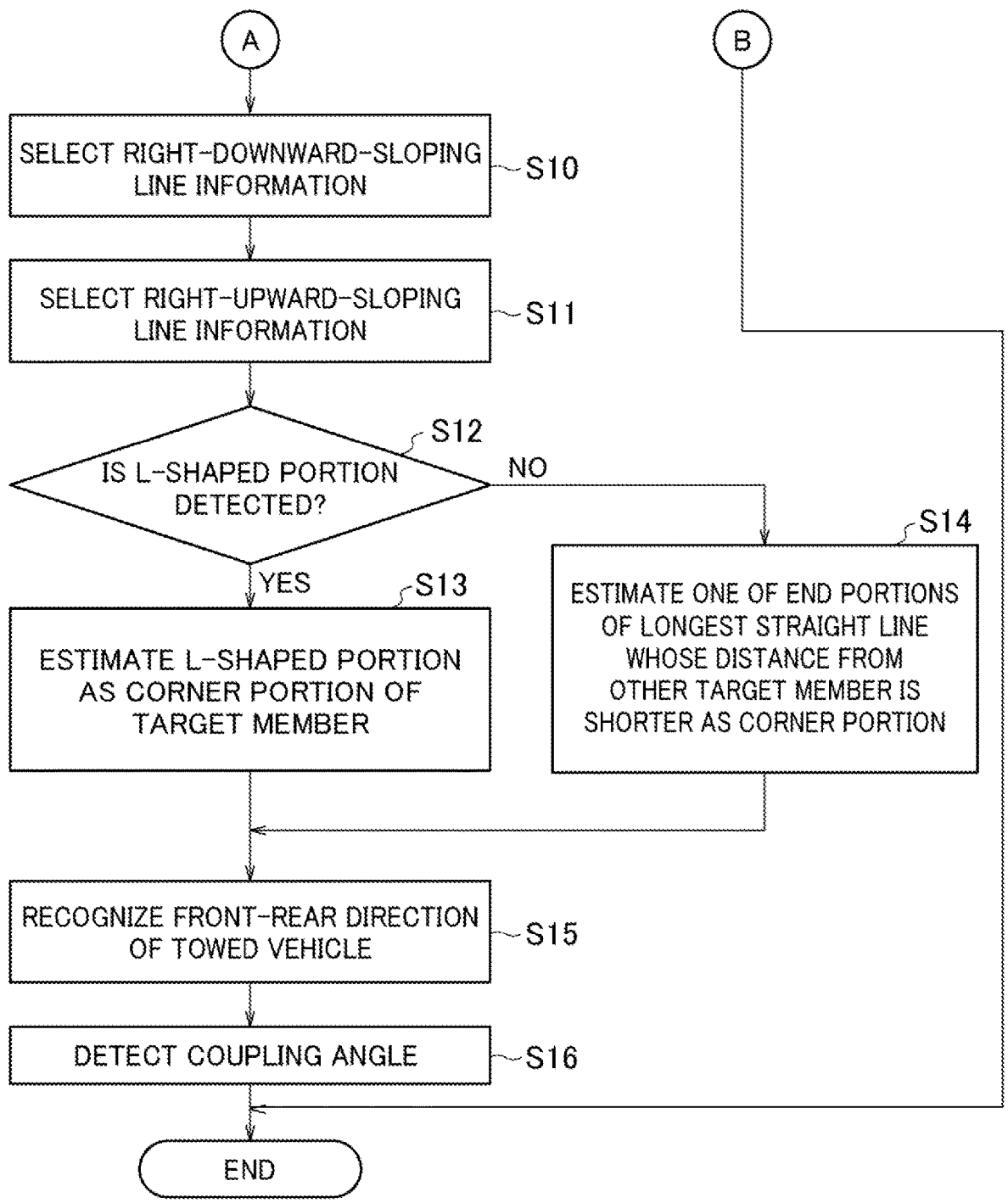
FIG. 4B is a flowchart illustrating a flow of the coupling angle detection processing performed by the coupling angle detection device according to the first embodiment.

FIGS. 4A and 4B are flowcharts illustrating a flow of coupling angle detection processing performed when the coupling angle detection device 30A acquires measurement information from the sensor 20. When measurement information is transmitted from the sensor 20, the measurement information acquisition unit 301 of the coupling angle detection device 30A acquires the measurement information ("YES" in S1) and transmits such information to the filtering unit 302.

Of the measurement information regarding the respective measurement points acquired by the measurement information acquisition unit 301, the filtering unit 302 performs filtering processing for the measurement information by extracting the measurement information whose ranging distance is within a prescribed range (S2). Specifically, the filtering unit 302 extracts the measurement information in which the ranging distance is within a range corresponding to the target members 40-1 and 40-2, among a plurality of measurement points in the target members 40-1 and 40-2 and in the projection member 3a. The information in this range is set in advance, in a range in which the probability (reliability) that the measurement points measured by the sensor 20 correspond to the target member 40-1 or 40-2 is equal to or greater than a prescribed value, on the basis of the installation position of the sensor 20 and the installation positions of the target members 40-1 and 40-2. In this filtering processing, the filtering unit 302 determines that the measurement points in the projection member 3a do not correspond to the target members 40-1 and 40-2, and excludes the measurement information of the projection member 3a from the object that is used for the coupling angle detection processing.

Figure 5:
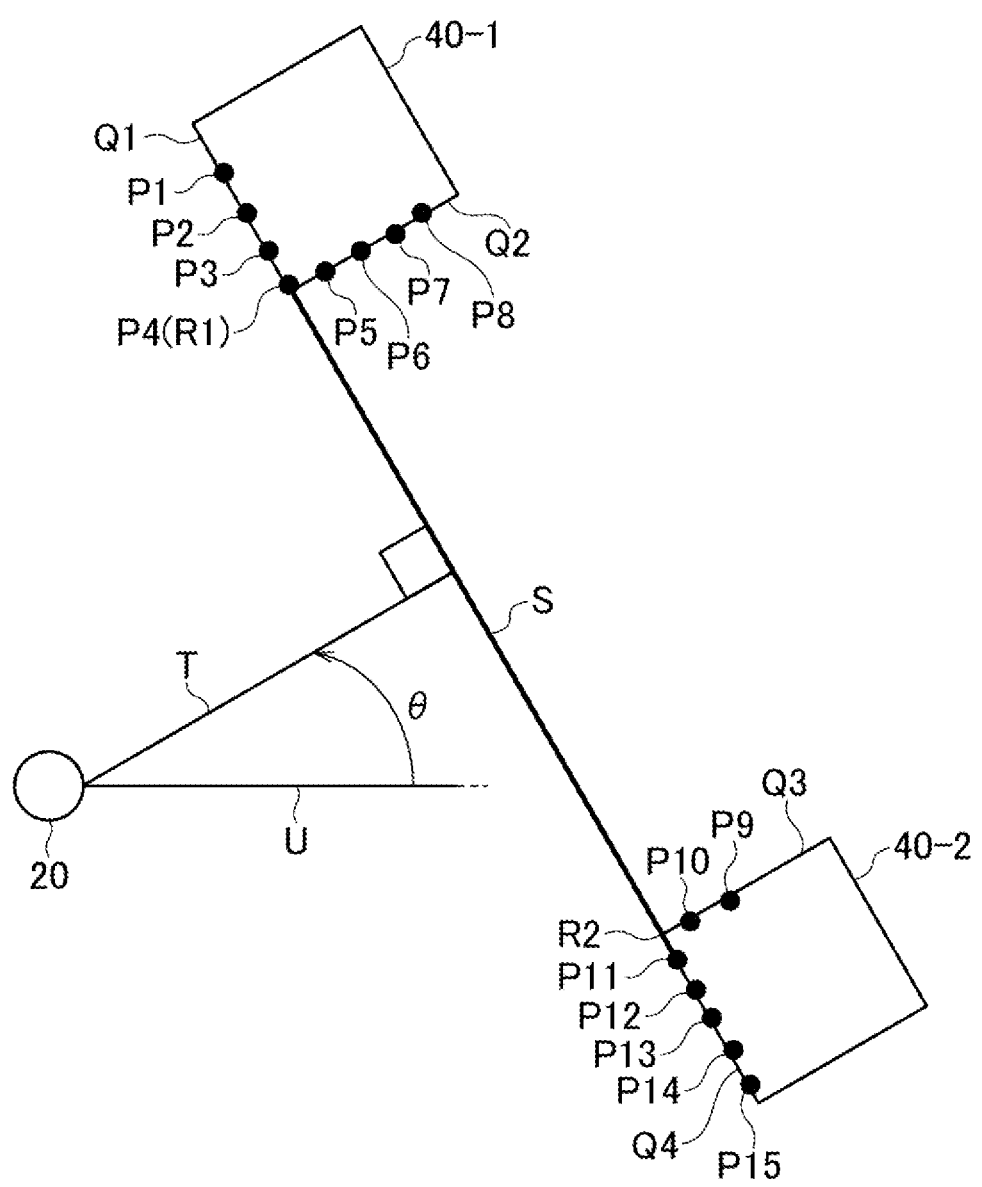
FIG. 5 is an explanatory diagram illustrating measurement points in target members measured by a sensor 20 connected to the coupling angle detection device according to the first embodiment, and a coupling angle that is detected based on the measurement point information.

Next, the clustering unit 303 performs an initial setting by giving identification information to the respective measurement points extracted by filtering processing (S3). Specifically, as illustrated in FIG. 5, the clustering unit 303 gives identification information P1, identification information P2, . . . identification information P15, to the fifteen measurement points, respectively.

Next, regarding the measurement points extracted by filtering processing, the clustering unit 303 performs clustering processing to recognize a set of measurement points whose distance from adjacent measurement points is less than a prescribed value, as a measurement point group related to one object. Specifically, the clustering unit 303 recognizes the set of measurement points of the identification information P1 to P8 as a measurement point group related to one object, and recognizes the set of measurement points of the identification information P9 to P15 as a measurement point group related to the other object.

The clustering unit 303 calculates the size of each object that is a measurement target, based on the measurement information regarding the measurement points in each recognized measurement point group (S4). The clustering unit 303 holds range information corresponding to the sizes of the target members 40-1 and 40-2 in advance, and recognizes that the object is the target member 40-1 or 40-2 if the calculated size of the object is within a range of the information that is held above. Here, the clustering unit 303 recognizes that the sizes of two objects that are measurement targets are within the range of the information that is held in advance, and that these two objects are the target members 40-1 and 40-2 ("YES" in S5).

Next, the straight line extraction unit 304 extracts measurement point groups constituting straight lines from among the measurement points corresponding to the recognized target members 40-1 and 40-2, and groups the measurement point groups for each straight line (S6). In addition, from among the grouped measurement point groups, the straight line extraction unit 304 extracts a measurement point group whose number of corresponding measurement points is equal to or greater than a prescribed first threshold value. This first threshold value is a value that is set to determine the reliability of the grouped measurement point group as a straight line portion. The straight line extraction unit 304 specifies a straight line from the extracted measurement point group (S7). Here, the straight line extraction unit 304 may use, for example, the least squares method when specifying a straight line from the extracted measurement point group.

Next, if there is a measurement point that does not belong to any of the straight line measurement point groups but is on an extension line of any of the straight lines specified for the respective target members 40-1 and 40-2, the straight line extraction unit 304 extends the straight line to the measurement point. If there is another straight line on an extension line of any of the straight lines which are specified, the straight line extraction unit 304 integrates these straight lines into one straight line (S8). By performing such extension processing and integration processing, the straight line extraction unit 304 can accurately extract the straight line portions of the target members 40-1 and 40-2.

Next, from among the extracted straight lines, the straight line extraction unit 304 extracts a straight line whose number of corresponding measurement points is equal to or greater than a prescribed second threshold value (S9). This second threshold value is a value that is set to determine the reliability of the specified straight line as a straight line constituting the outer shape of the target members 40-1 and 40-2.

Next, the corner estimation unit 305 selects the right-downward-sloping line and the right-upward-sloping line for each of the target members 40-1 and 40-2, from the straight lines extracted by the straight line extraction unit 304 (S10 and S11). For example, as illustrated in FIG. 5, the corner estimation unit 305 selects the straight line Q1 specified by the measurement point groups P1 to P4 as the right-downward-sloping line, and the straight line Q2 specified by the measurement point groups P4 to P8 as the right-upward-sloping line, regarding the target member 40-1. The corner estimation unit 305 also selects the straight line Q3 specified by the measurement point groups P9 and P10 as the right-upward-sloping line, and the straight line Q4 specified by the measurement point groups P11 to P15 as the right-downward-sloping line, regarding the target member 40-2.

Thereafter, the corner estimation unit 305 detects an L-shaped portion where the selected right-downward-sloping line and right-upward-sloping line intersect with each other, regarding each of the target members 40-1 and 40-2.

Next, when the corner estimation unit 305 detects an L-shaped portion corresponding to each of the target members 40-1 and 40-2 ("YES" in S12), the position of the detected L-shaped portion is estimated as a corner portion of each of the target members 40-1 and 40-2 (S13). For example, as illustrated in FIG. 5, the corner estimation unit 305 estimates the corner portion of the target member 40-1 from the lines Q1 and Q2, and estimates the corner portion of the target member 40-2 from the lines Q3 and Q4.

When the corner estimation unit 305 does not detect an L-shaped portion corresponding to the target member 40-1 or 40-2 in step S12 ("NO" in step S12), the corner estimation unit 305 recognizes the longest straight line from among the straight lines extracted by the straight line extraction unit 304, as a straight line constituting one target member. The corner estimating unit 305 then estimates one of the end portions of the recognized straight line whose distance from the other target member is shorter, as an apex of the corner portion of one target member (S14).

Next, the coupling angle detection unit 306A specifies an apex R1 of the corner portion of the target member 40-1, and an apex R2 of the corner portion of the target member 40-2, and further specifies the straight line S connecting these apexes R1 and R2. The corner estimation unit 305 then specifies the direction T perpendicular to the straight line S, and recognizes (determines) the specified direction T as the front-rear direction of the vehicle body of the towed vehicle 3 (S15).

Next, the coupling angle detection unit 306A detects an angle θ formed by the recognized front-rear direction T of the vehicle body of the towed vehicle 3 (the specified direction T) and the front-rear direction of the vehicle body of the towing vehicle 2 that is held in advance, as the coupling angle of the towing motor vehicle 1A (S16). The coupling angle detection unit 306A outputs the information of the detected coupling angle of the towing motor vehicle 1A, to the driving control device 10.

When the towing motor vehicle 1A is an automatic driving vehicle, the driving control device 10 functions as an automatic driving control unit, and changes the contents of automatic driving by means of the automatic operation control function when detecting that the coupling angle detected by the coupling angle detection device 30A has reached a prescribed value or more. For example, the driving control device 10 reduces a traveling speed of the vehicle or stops the driving of the vehicle when detecting that the coupling angle has reached a prescribed value or more.

By performing the driving control in this manner, it is possible to ensure safe traveling when the towing motor vehicle 1A performing the automatic driving turns in the right or left direction and a coupling angle thereof increases.

When the towing motor vehicle 1A is a vehicle driven by a driver, the driving control device 10 functions as a notification information output unit, and when detecting that a coupling angle detected by the coupling angle detection device 30A has reached a prescribed value or more, the driving control device 10 outputs information for notifying the driver of the detected contents by means of the notification information output function.

By outputting the information in this manner, it is possible to alert the driver when the towing motor vehicle 1A driven by the driver turns in the right or left direction and a coupling angle thereof increases, thereby supporting safe driving.

According to the first embodiment, the shape of the two target members 40-1 and 40-2 installed in the towed vehicle 3 is measured by the sensor 20 installed in the towing vehicle 2 of the towing motor vehicle 1A. Therefore, a coupling angle between the towing vehicle 2 and the towed vehicle 3 can be accurately detected with simple processing. In this case, even if the coupling angle between the towing vehicle 2 and the towed vehicle 3 changes and the distance between the sensor 20 and the target members 40-1 and 40-2 increases, the coupling angle detection processing can be performed with high accuracy without being affected by the increase in the distance, and without requiring the maintenance of the target members 40-1 and 40-2.

Second Embodiment (Configuration of Towing Motor Vehicle 1B Using Coupling Angle Detection Device 30B According to Second Embodiment)

Figure 6:
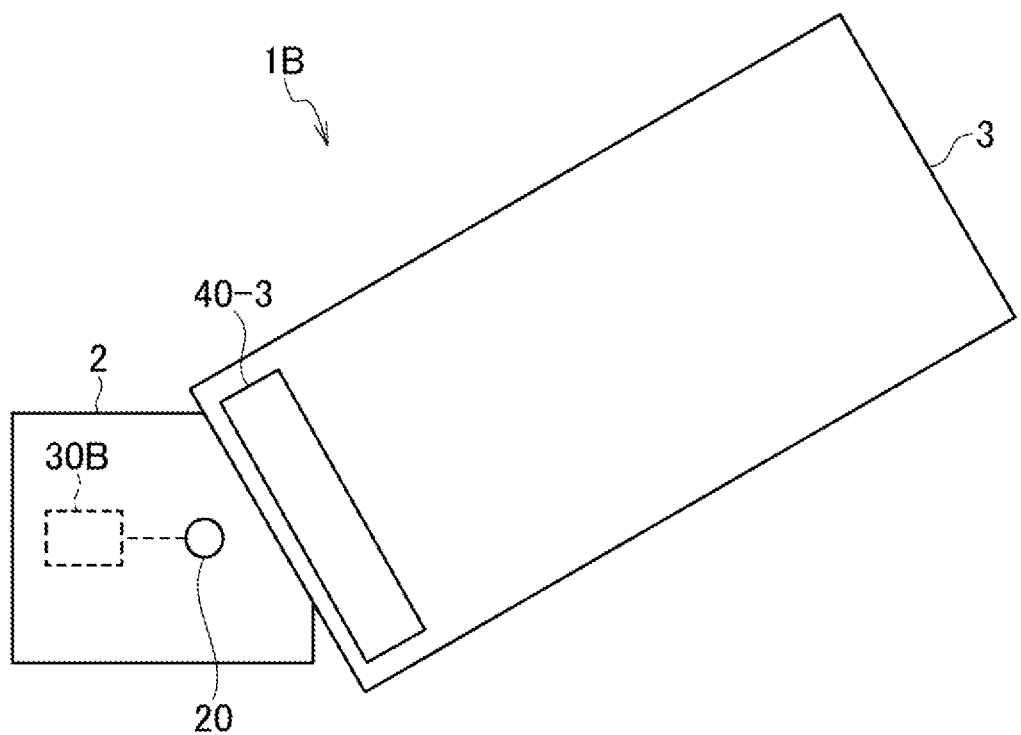
FIG. 6 is a top view of a towing motor vehicle in which a coupling angle detection device according to a second embodiment is installed.

Since the configuration of the towing motor vehicle 1B according to the second embodiment is similar to the configuration of the towing motor vehicle 1A in FIG. 1 described in the first embodiment, a detailed description of the parts having the same functions will be omitted. In the present embodiment, as illustrated in FIG. 6, one target member 40-3 formed of a rectangular parallelepiped is installed at a prescribed position of the towed vehicle 3.

Figure 7:
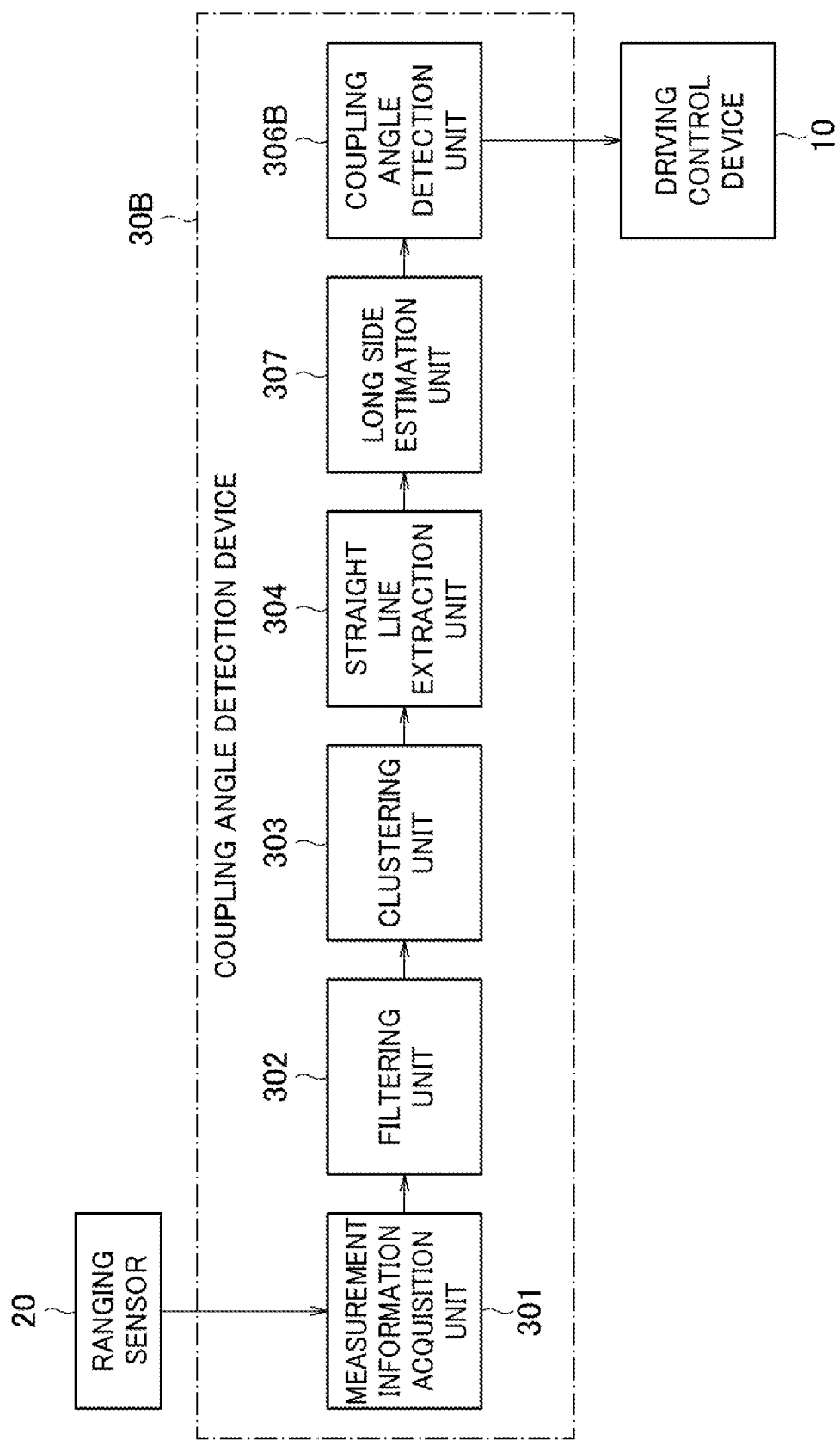
FIG. 7 is a block diagram illustrating a configuration of the coupling angle detection device according to the second embodiment.

As illustrated in FIG. 7, the coupling angle detection device 30B according to the present embodiment includes the measurement information acquisition unit 301, the filtering unit 302, the clustering unit 303, the straight line extraction unit 304, a long side estimation unit 307, and a coupling angle detection unit 306B. The functions other than those of the long side estimation unit 307 and the coupling angle detection unit 306B are the same as those of the first embodiment, and thus a detailed description thereof will be omitted.

The long side estimation unit 307 estimates the long side portion of the target member 40-3, based on the information of the straight line portion extracted by the straight line extraction unit 304. The coupling angle detection unit 306B specifies the front-rear direction of the vehicle body of the towed vehicle 3, based on the information of the long side portion of the target member 40-3 estimated by the long side estimation unit 307, and further detects the coupling angle of the towing motor vehicle 1B.

(Operation of Towing Motor Vehicle 1B Using Coupling Angle Detection Device 30B According to Second Embodiment)

The operation of the towing motor vehicle 1B using the coupling angle detection device 30B according to the present embodiment will be described below. In the present embodiment, the target member 40-3 is formed of a rectangular parallelepiped. The target member 40-3 is installed in the towed vehicle 3 such that the long side at the towing vehicle 2 side overlaps a line perpendicular to the front-rear direction of the vehicle body of the towed vehicle 3 on a plane parallel to the traveling surface of the towing motor vehicle 1B.

During traveling of the towing motor vehicle 1B, the sensor 20 measures the distance to a plurality of measurement points in the object including the target member 40-3 positioned in the upper surface area of the towed vehicle 3 at prescribed time intervals. The sensor 20 extracts measurement information regarding the plurality of measurement points in the target member 40-3, and transmits such information to the coupling angle detection device 30B.

Figure 8:
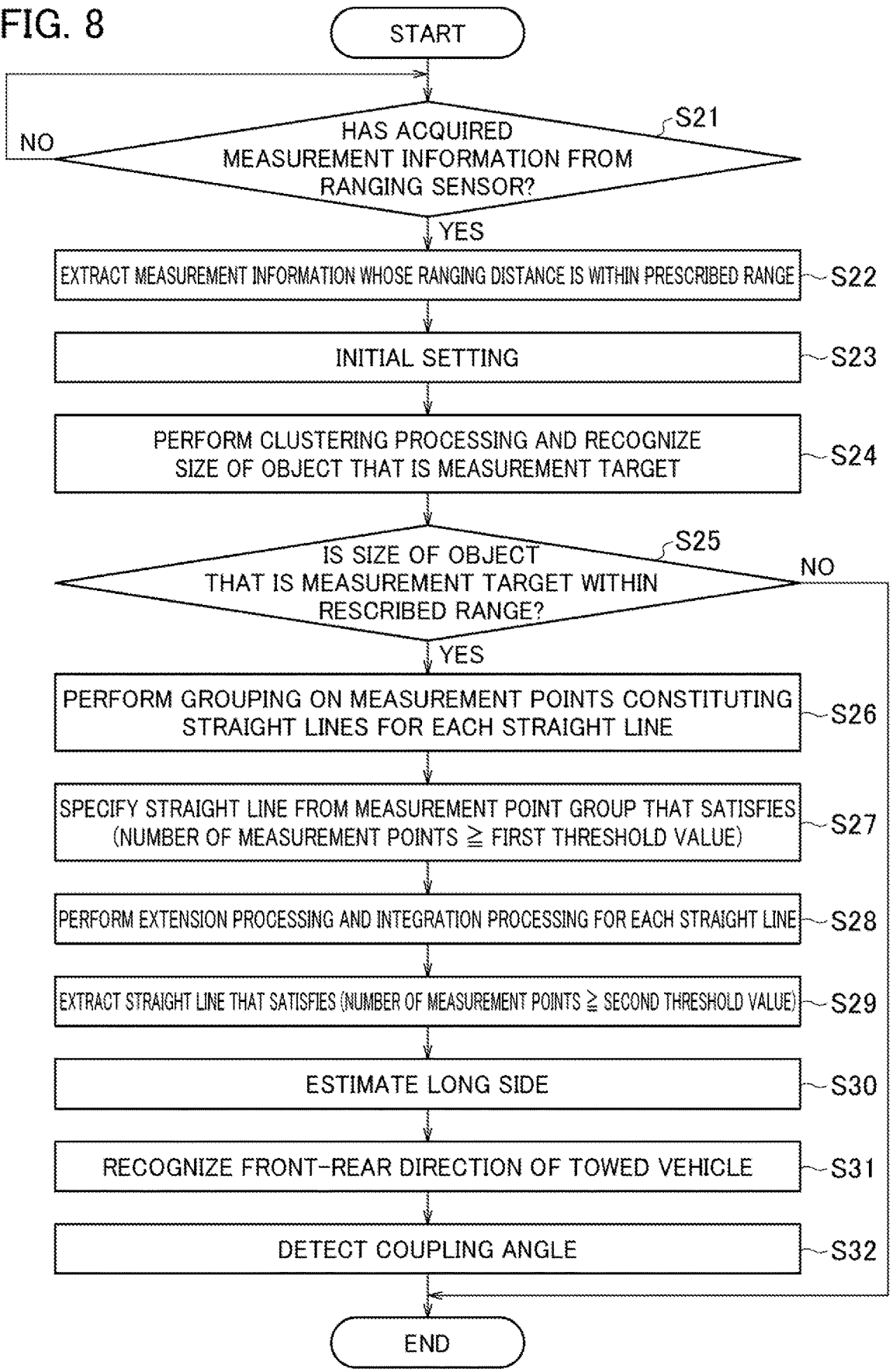
FIG. 8 is a flowchart illustrating a flow of coupling angle detection processing performed by the coupling angle detection device according to the second embodiment.

FIG. 8 is a flowchart illustrating a flow of coupling angle detection processing performed when the coupling angle detection device 30B acquires measurement information from the sensor 20. Since the processing of steps S21 to S29 in FIG. 8 is the same as the processing of steps S1 to S9 described in the first embodiment, a detailed description thereof will be omitted.

When the straight line extraction unit 304 extracts a straight line portion of the object on the towed vehicle 3 in step S29, based on the measurement information measured by the sensor 20, the long side estimation unit 307 estimates the long side portion of the target member 40-3, based on the information on the extracted straight line portion. Specifically, the long side estimation unit 307 estimates (specifies) the longest straight line, as the long side portion of the target member 40-3 (S30).

Next, the coupling angle detection unit 306B specifies the direction perpendicular to the long side of the target member 40-3, and recognizes (determines) the specified direction as the front-rear direction of the vehicle body of the towed vehicle 3 (S31). The coupling angle detection unit 306B then detects an angle formed by the front-rear direction of the vehicle body of the towed vehicle 3 that is recognized and the front-rear direction of the vehicle body of the towing vehicle 2 that is held in advance, as a coupling angle of the towing motor vehicle 1B (S32).

According to the second embodiment, the shape of one target member 40-3 installed in the towed vehicle 3 is measured by the sensor 20 installed in the towing vehicle 2 of the towing motor vehicle 1B. Therefore, a coupling angle between the towing vehicle 2 and the towed vehicle 3 can be accurately detected with simpler processing than that of the first embodiment.

Third Embodiment (Configuration of Towing Motor Vehicle 1C Using Coupling Angle Detection Device 30C According to the Third Embodiment)

Figure 9:
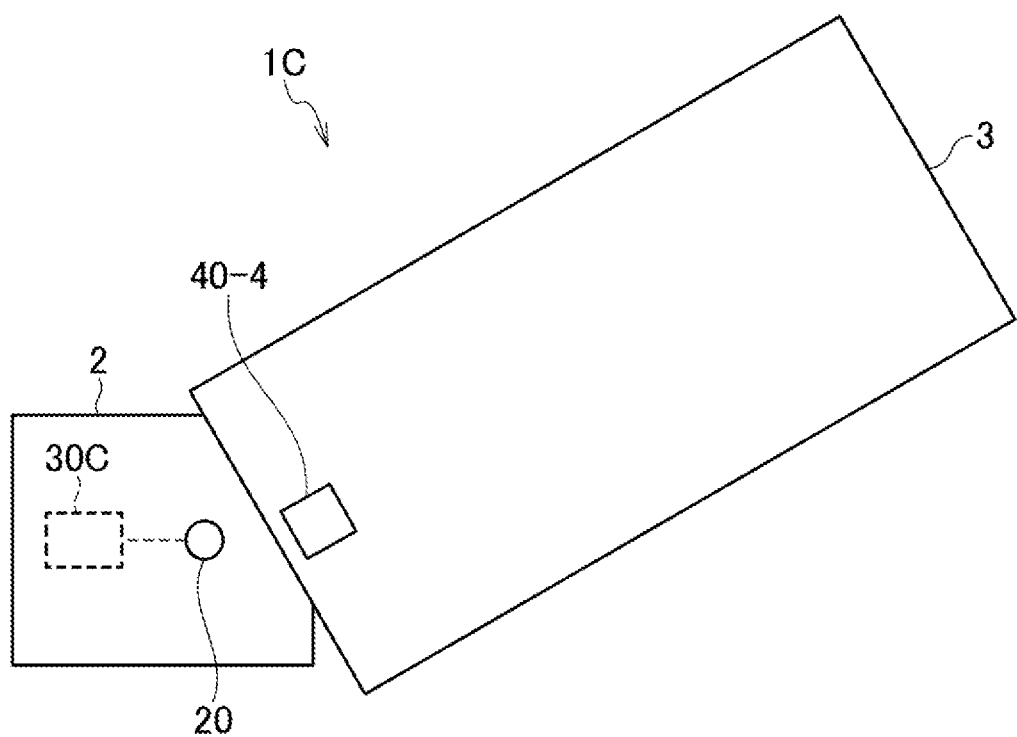
FIG. 9 is a top view of a towing motor vehicle in which a coupling angle detection device according to a third embodiment is installed.

Since the configuration of the towing motor vehicle 1C according to the third embodiment is similar to the configuration of the towing motor vehicle 1A in FIG. 1 described in the first embodiment, a detailed description of the parts having the same functions will be omitted. In the present embodiment, as illustrated in FIG. 9, one target member 40-4 formed in a rectangular shape close to a cube is installed at a prescribed position of the towed vehicle 3.

Figure 10:
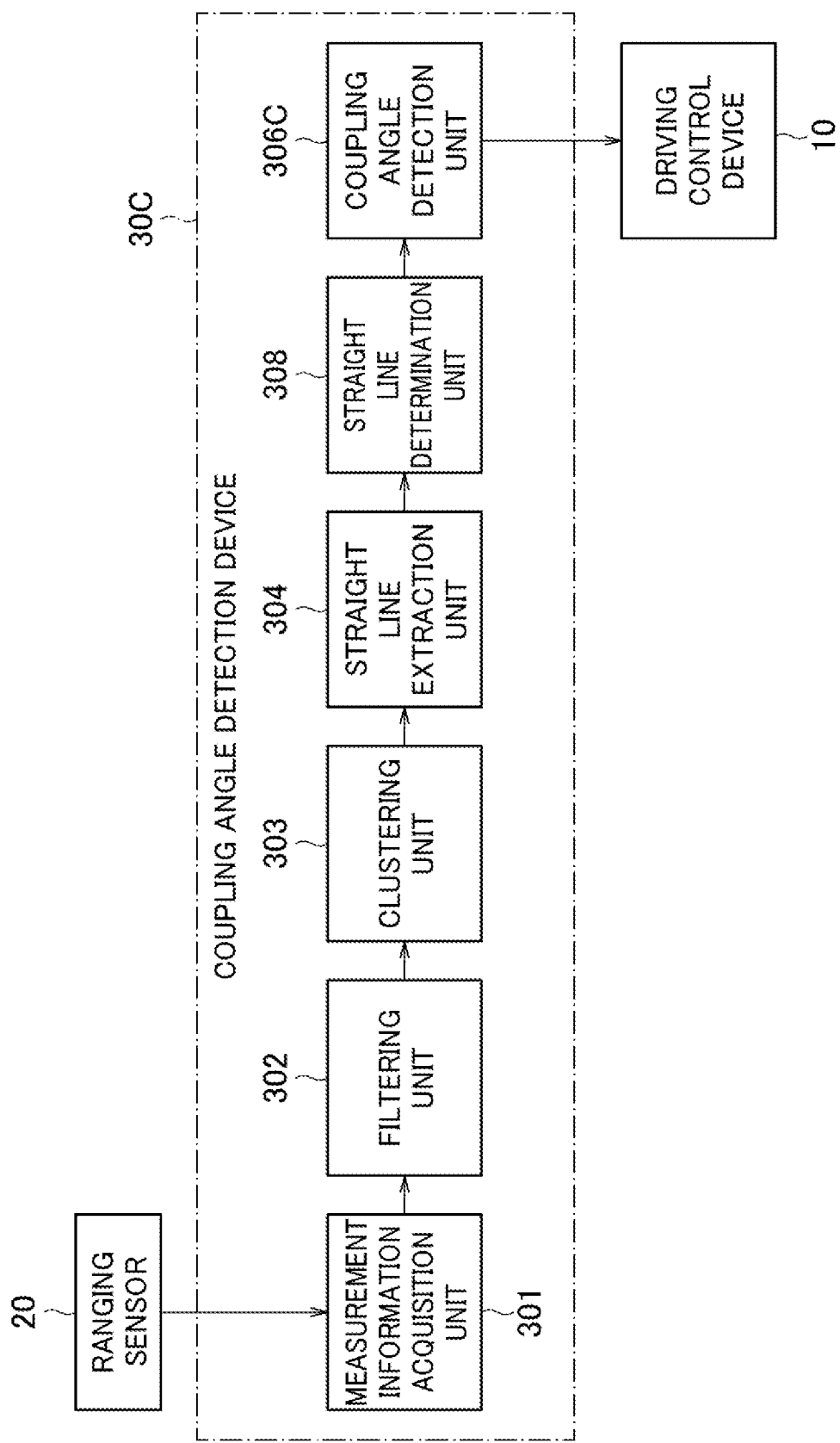
FIG. 10 is a block diagram illustrating a configuration of the coupling angle detection device according to the third embodiment.

As illustrated in FIG. 10, the coupling angle detection device 30C according to the present embodiment includes the measurement information acquisition unit 301, the filtering unit 302, the clustering unit 303, the straight line extraction unit 304, a straight line determination unit 308, and a coupling angle detection unit 306C. The functions other than those of the straight line determination unit 308 and the coupling angle detection unit 306C are the same as those of the first embodiment, and thus a detailed description thereof will be omitted.

The straight line determination unit 308 determines a straight line portion corresponding to one side of the target member 40-4, based on the information of the straight line portion extracted by the straight line extraction unit 304. The coupling angle detection unit 306C specifies the front-rear direction of the vehicle body of the towed vehicle 3, based on the information of the one side portion of the target member 40-4 determined by the straight line determination unit 308, and further detects the coupling angle of the towing motor vehicle 1C.

(Operation of Towing Motor Vehicle 1C Using Coupling Angle Detection Device 30C According to Third Embodiment)

The operation of the towing motor vehicle 1C using the coupling angle detection device 30C according to the present embodiment will be described. In the present embodiment, the target member 40-4 is formed in a rectangular shape close to a cube. The target member 40-4 is installed in the towed vehicle 3 such that one side at the towing vehicle 2 side overlaps a line perpendicular to the front-rear direction of the vehicle body of the towed vehicle 3 on a plane parallel to the traveling surface of the towing motor vehicle 1C.

During traveling of the towing motor vehicle 1C, the sensor 20 measures the distance to a plurality of measurement points in the object including the target member 40-4 positioned in the upper surface area of the towed vehicle 3 at prescribed time intervals. The sensor 20 extracts measurement information regarding the plurality of measurement points in the target member 40-4, and transmits such information to the coupling angle detection device 30C.

Figure 11:
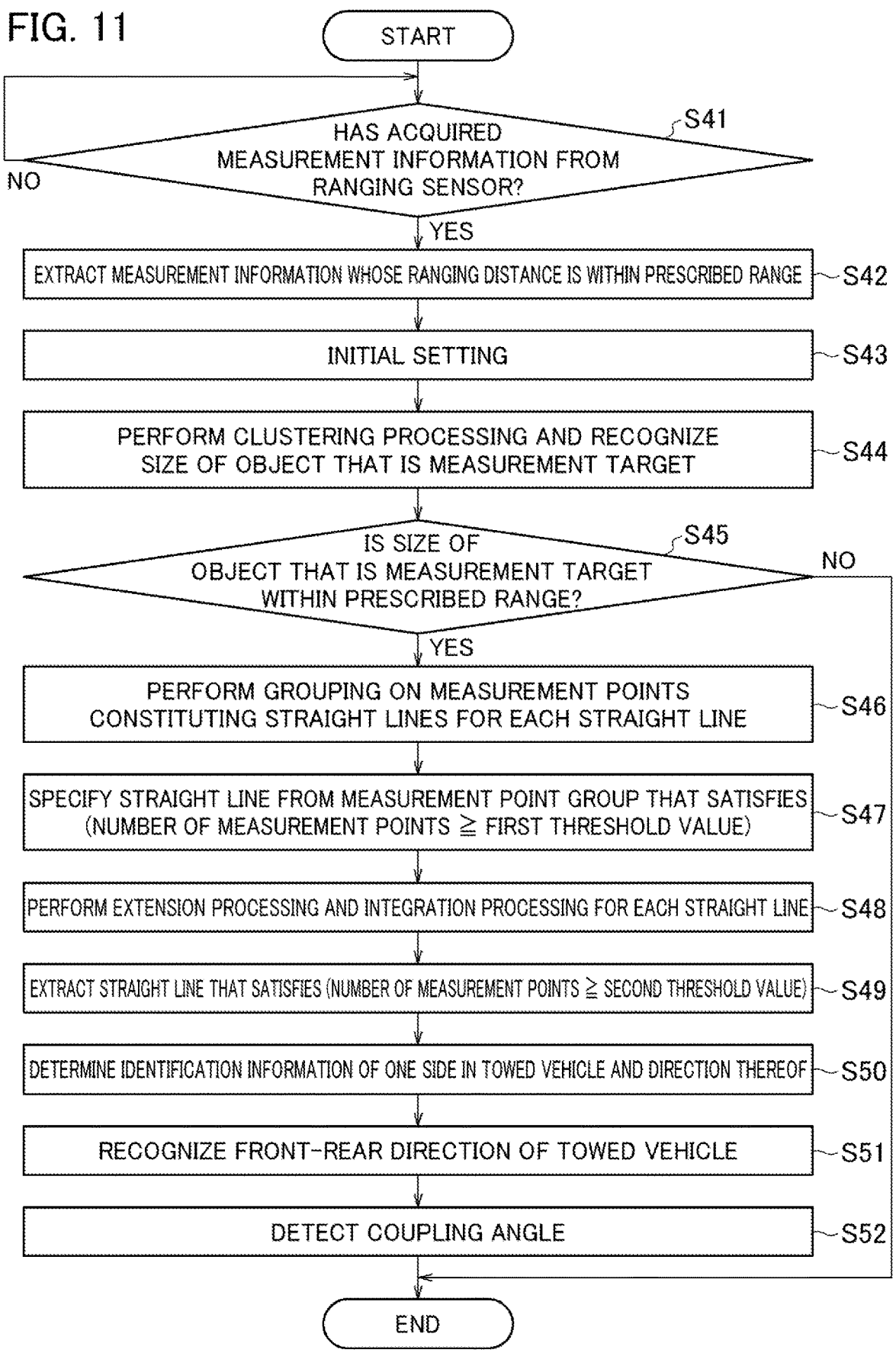
FIG. 11 is a flowchart illustrating a flow of coupling angle detection processing performed by the coupling angle detection device according to the third embodiment.

FIG. 11 is a flowchart illustrating a flow of coupling angle detection processing performed when the coupling angle detection device 30C acquires measurement information from the sensor 20. Since the processing of steps S41 to S49 in FIG. 11 is the same as the processing of steps S1 to S9 described in the first embodiment, a detailed description thereof will be omitted.

When the straight line extraction unit 304 extracts straight line portions of the object on the towed vehicle 3 in step S49, based on the measurement information measured by the sensor 20, the straight line determination unit 308 determines a straight line portion corresponding to one side of the target member 40-4, based on the information on the extracted straight line portions. The processing in which the straight line determination unit 308 determines a straight line portion corresponding to one side of the target member 40-4 will be described below.

Figure 12:
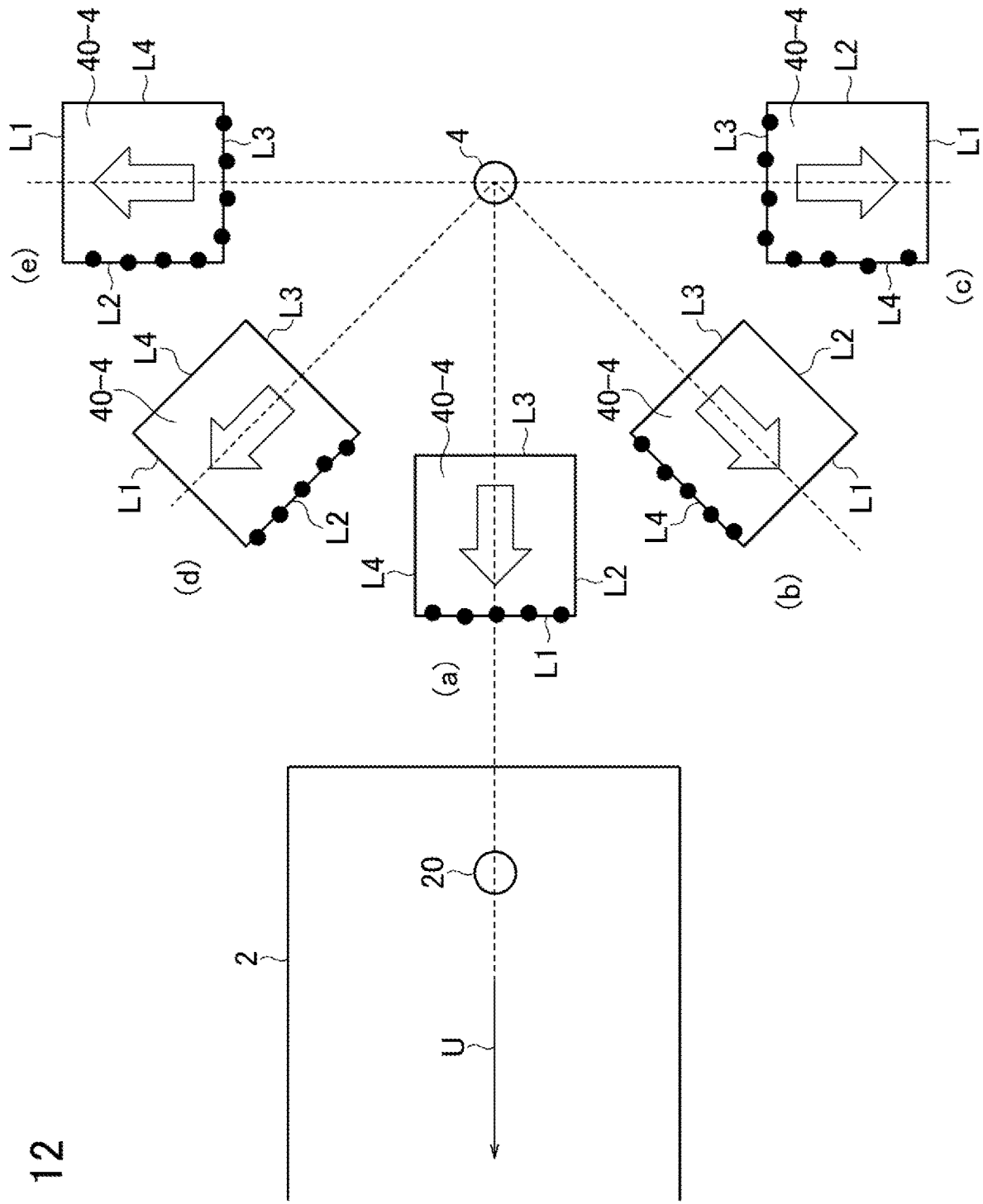
FIG. 12 is an explanatory diagram illustrating measurement points in a target member, which is measured by a sensor 20 connected to the coupling angle detection device according to the third embodiment, for each coupling angle.

As illustrated in FIG. 12, when the coupling angle is 0° and the target member 40-4 is in the position (a), the side of the target member 40-4 at the towing vehicle 2 side is L1, and the sides of the target member 40-4 sequentially arranged in the counterclockwise direction from the side L1 are L2, L3, and L4.

Here, when the coupling angle is between 0° and about 45° in the left-right direction, the straight line in the target member 40-4 measured by the sensor 20 is the side L1. When the coupling angle is between about 45° and about 90° in the left direction, the target member 40-4 is, for example, in the position (b) in FIG. 12, and the straight line in the target member 40-4 measured by the sensor 20 is the side L4. When the coupling angle is about 90° in the left direction, the target member 40-4 is, for example, in the position (c) in FIG. 12, and the straight line in the target member 40-4 measured by the sensor 20 is the side L3 and the side L4. When the coupling angle is between about 45° and about 90° in the right direction, the target member 40-4 is, for example, in the position (d) in FIG. 12, and the straight line in the target member 40-4 measured by the sensor 20 is the side L2. When the coupling angle is about 90° in the right direction, the target member 40-4 is, for example, in the position (e) in FIG. 12, and the straight line in the target member 40-4 measured by the sensor 20 is the side L3 and the side L2.

The straight line determination unit 308 holds in advance, information indicating the correspondence relationship between the coupling angle described above, the position of the target member 40-4, and the identification information on the side measured by the sensor 20. The straight line determination unit 308 then selects, from among the information on the straight line portions extracted by the straight line extraction unit 304, the straight line portion having the longest length, but not the side closest to the coupling mechanism 4 in the target member 40-4. Next, the straight line determination unit 308 determines, based on the information that is held, the identification information of one side in the target member 40-4 corresponding to the selected straight line portion, that is, the position of one side in the target member 40-4 and the direction thereof (S50).

Next, the coupling angle detection unit 306C calculates (specifies) the directions of the sides L2 and L4, based on the identification information of one side in the target member 40-4 and the direction thereof which are determined by the straight line determination unit 308, and recognizes (determines) the calculated direction as the front-rear direction of the vehicle body of the towed vehicle 3 (S51). The coupling angle detection unit 306C then detects an angle formed by the recognized front-rear direction of the vehicle body of the towed vehicle 3 and the front-rear direction of the vehicle body of the towing vehicle 2 that is held in advance, as a coupling angle of the towing motor vehicle 1C (S52).

According to the third embodiment, the shape of one target member 40-4 installed in the towed vehicle 3 is measured by the sensor 20 installed in the towing vehicle 2 of the towing motor vehicle 1C. For this reason, a coupling angle between the towing vehicle 2 and the towed vehicle 3 can be accurately detected with simpler processing than that of the first embodiment. In addition, the target member 40-4 used in the present embodiment has a shape close to a cube. Therefore, unlike the target member 40-3 used in the second embodiment, the space for installing a long object is not required on the towed vehicle 3 thereby increasing the degree of freedom in terms of installation.

Fourth Embodiment (Configuration of Towing Motor Vehicle 1D Using Coupling Angle Detection Device 30D According to Fourth Embodiment)

Figure 13:
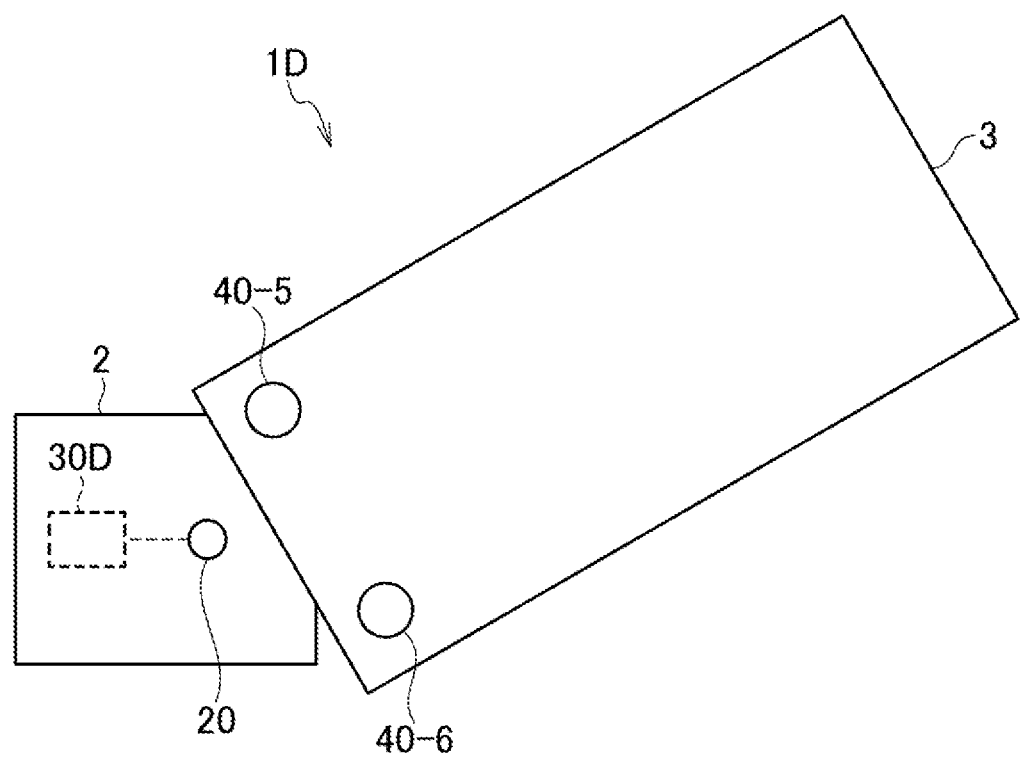
FIG. 13 is a top view of a towing motor vehicle in which a coupling angle detection device according to a fourth embodiment is installed.

Since the configuration of the towing motor vehicle 1D according to the fourth embodiment is the same as that of the towing motor vehicle 1A in FIG. 1 described in the first embodiment, a detailed description of the parts having the same functions will be omitted. In the present embodiment, as illustrated in FIG. 13, two target members 40-5 and 40-6 formed in a cylindrical shape are installed at prescribed positions of the towed vehicle 3. Three or more cylindrical target members may be installed in the towed vehicle 3.

Figure 14:
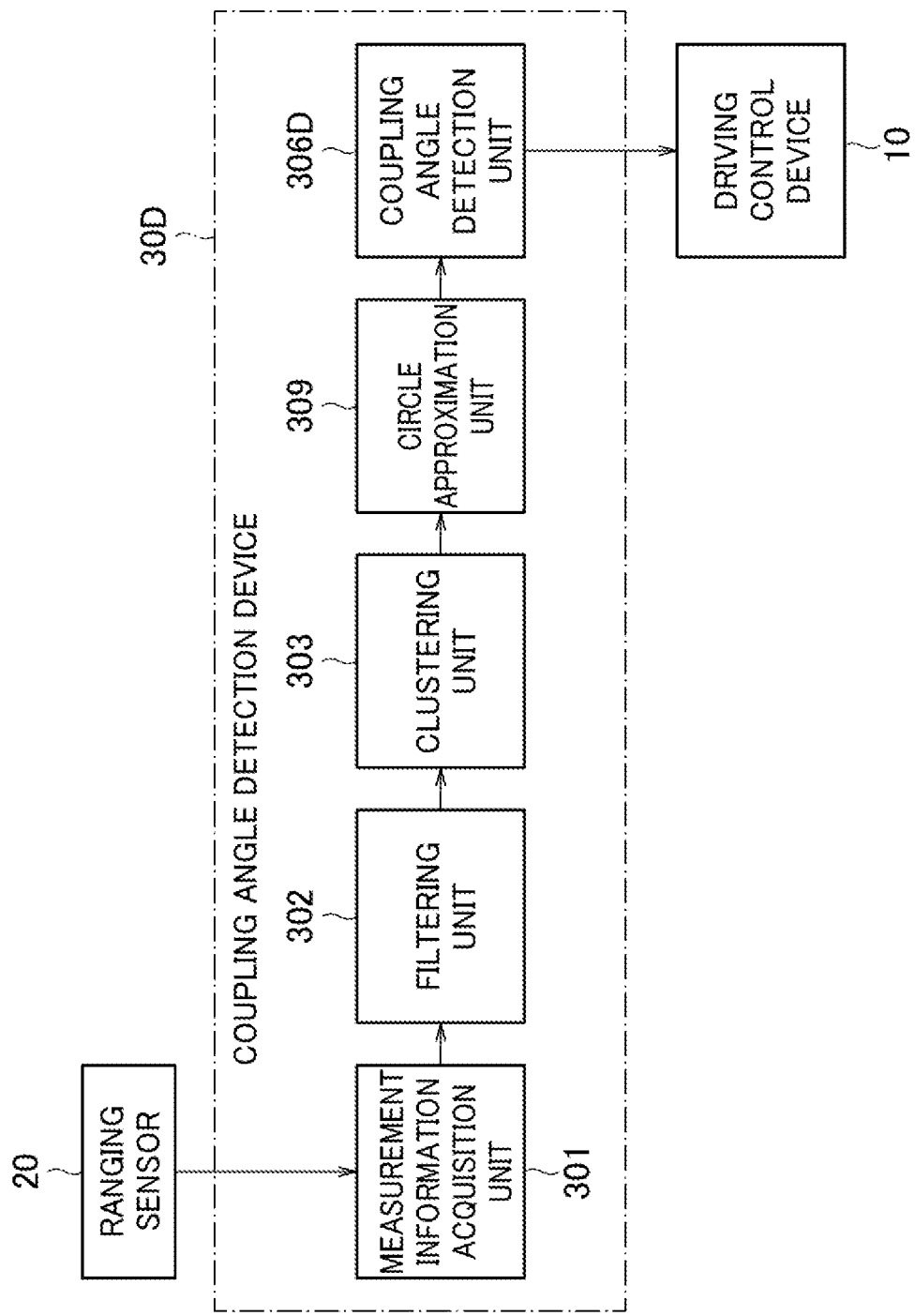
FIG. 14 is a block diagram illustrating a configuration of the coupling angle detection device according to the fourth embodiment.

As illustrated in FIG. 14, the coupling angle detection device 30D according to the present embodiment includes the measurement information acquisition unit 301, the filtering unit 302, the clustering unit 303, a circle approximation unit 309, and a coupling angle detection unit 306D. The functions other than those of the circle approximation unit 309 and the coupling angle detection unit 306D are the same as those of the first embodiment, and thus a detailed description thereof will be omitted.

The circle approximation unit 309 detects the respective center positions of the circles of the target members 40-5 and 40-6, by performing circle approximation processing using, for example, the least squares method, on the measurement group corresponding to the objects recognized as the target members 40-5 and 40-6 by means of the clustering unit 303. The coupling angle detection unit 306D specifies the front-rear direction of the vehicle body of the towed vehicle 3, based on the information of the respective center positions of the circles of the target members 40-5 and 40-6 detected by the circle approximation unit 309, and further detects the coupling angle of the towing motor vehicle 1D.

(Operation of Towing Motor Vehicle 1D Using Coupling Angle Detection Device 30D According to Fourth Embodiment)

The operation of the towing motor vehicle 1D using the coupling angle detection device 30D according to the present embodiment will be described below. In the present embodiment, the target members 40-5 and 40-6 are formed in a cylindrical shape. The target members 40-5 and 40-6 are installed in the towed vehicle 3 such that the respective center positions of the circles overlap a line perpendicular to the front-rear direction of the body of the towed vehicle 3.

During traveling of the towing motor vehicle 1D, the sensor 20 measures the distance to a plurality of measurement points in the objects including target members 40-5 and 40-6 positioned in the upper surface area of the towed vehicle 3 at prescribed time intervals. The sensor 20 extracts measurement information regarding the plurality of measurement points in the target members 40-5 and 40-6, and transmits such information to the coupling angle detection device 30D.

Figure 15:
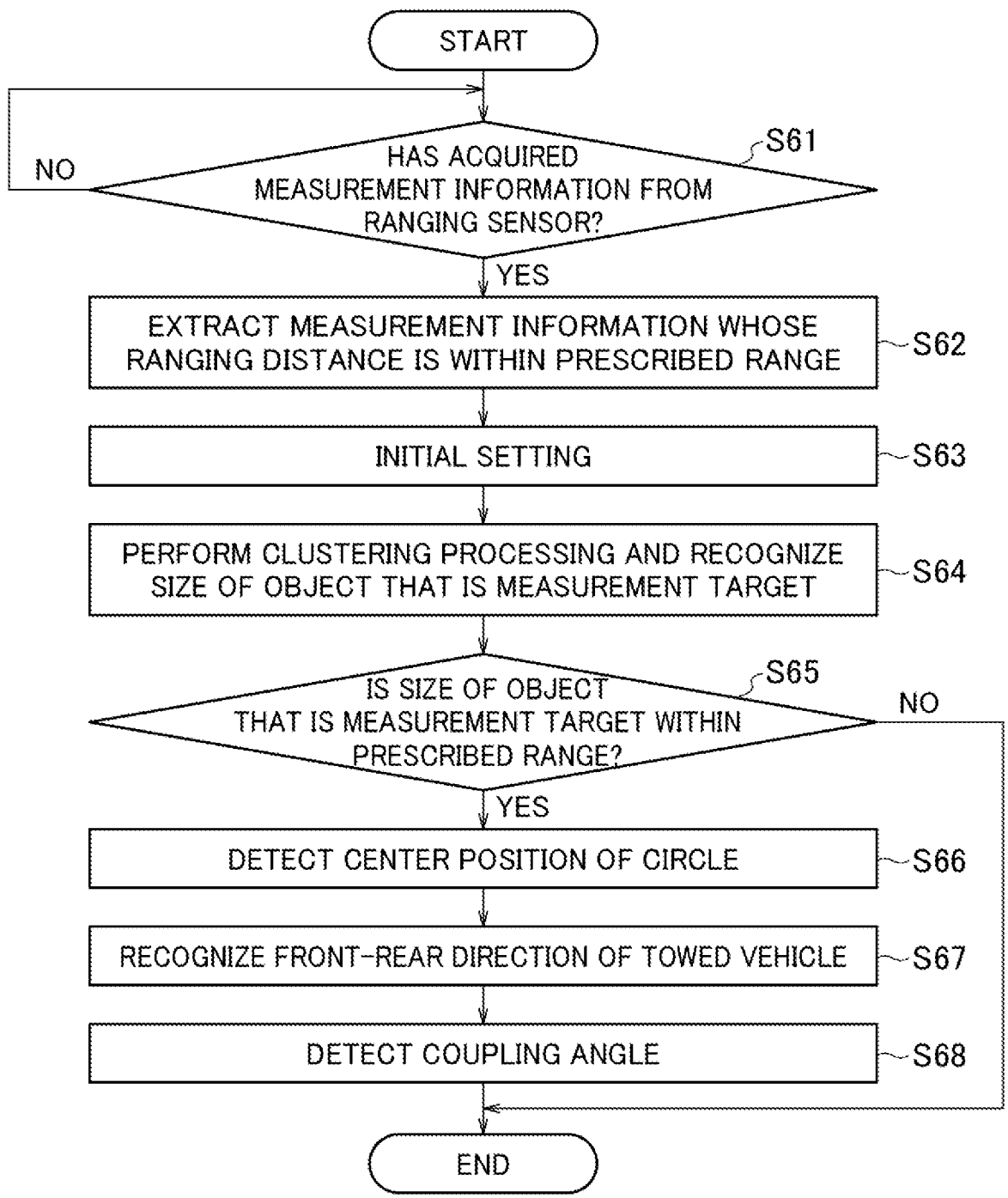
FIG. 15 is a flowchart illustrating a flow of coupling angle detection processing performed by the coupling angle detection device according to the fourth embodiment.

FIG. 15 is a flowchart illustrating a flow of coupling angle detection processing performed when the coupling angle detection device 30D acquires measurement information from the sensor 20. Since the processing of steps S61 to S65 in FIG. 15 is the same as the processing of steps S1 to S5 described in the first embodiment, a detailed description thereof will be omitted.

When the clustering unit 303 recognizes that the sizes of two objects that are measurement targets are within the range of the information that is held in advance, and that these two objects are the target members 40-5 and 40-6 ("YES" in S65), the processing proceeds to step S66. In step S66, the circle approximation unit 309 performs circle approximation processing using, for example, the least squares method, on the measurement group corresponding to the target members 40-5 and 40-6 recognized by the clustering unit 303. The circle approximation unit 309 then detects the respective center positions of the circles of the target members 40-5 and 40-6 (S66).

Next, the coupling angle detection unit 306D calculates (specifies) a direction perpendicular to the straight line coupling the center positions of the circles detected by the circle approximation unit 309, and recognizes (determines) the calculated direction as the front-rear direction of the vehicle body of the towed vehicle 3 (S67). The coupling angle detection unit 306D then detects an angle formed by the recognized front-rear direction of the vehicle body of the towed vehicle 3 and the front-rear direction of the vehicle body of the towing vehicle 2 that is held in advance, as the coupling angle of the towing motor vehicle 1D (S68).

According to the fourth embodiment, the shape of two cylindrical target members 40-5 and 40-6 installed in the towed vehicle 3 is measured by the sensor 20 installed in the towing vehicle 2 of the towing motor vehicle 1D. Therefore, the coupling angle between the towing vehicle 2 and the towed vehicle 3 can be accurately detected with simpler processing than that of the first embodiment.

Fifth Embodiment (Configuration of Towing Motor Vehicle 1E Using Coupling Angle Detection Device 30E According to Fifth Embodiment)

Since the configuration of the towing motor vehicle 1E according to the fifth embodiment is the same as that of the towing motor vehicle 1A in FIG. 1 described in the first embodiment, a detailed description of the parts having the same functions will be omitted. In the present embodiment, the shape and number of target members and the position of target members on the towed vehicle 3 are not limited. For example, target members, which are installed on the towed vehicle 3, having the same shape and the same number as any of the first to fourth embodiments can be used.

Figure 16:
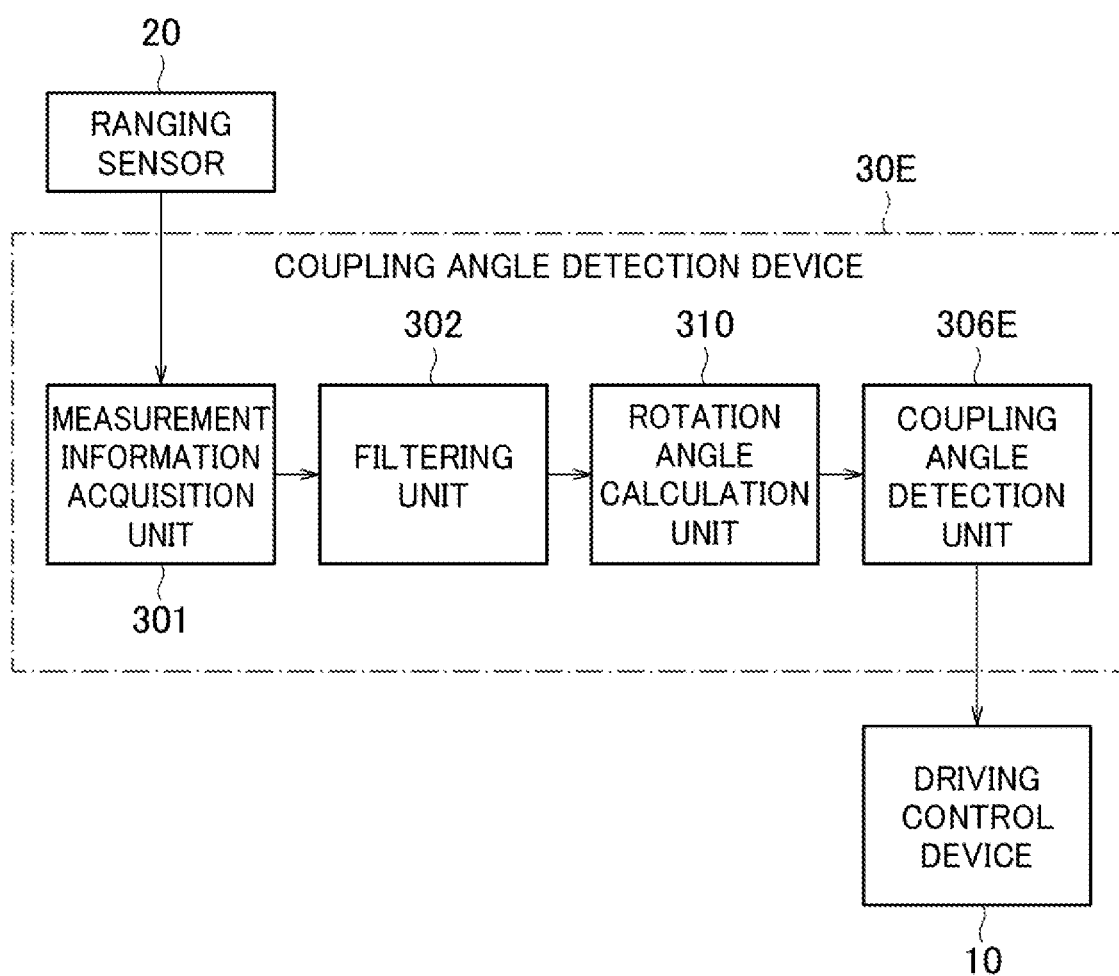
FIG. 16 is a block diagram illustrating a configuration of a coupling angle detection device according to a fifth embodiment.

As illustrated in FIG. 16, the coupling angle detection device 30E according to the present embodiment includes the measurement information acquisition unit 301, the filtering unit 302, a rotation angle calculation unit 310, and a coupling angle detection unit 306E. The functions other than those of the rotation angle calculation unit 310 and the coupling angle detection unit 306E are the same as those of the first embodiment, and thus a detailed description thereof will be omitted.

The rotation angle calculation unit 310 holds in advance, the first shape information which is the shape information of the target member which is acquired, based on the information measured by the sensor 20 when the coupling angle between the towing vehicle 2 and the towed vehicle 3 is 0°. The rotation angle calculation unit 310 calculates the rotation angle of the target member relative to the position of the sensor 20, based on the shape information of the target member which is held above and the second shape information which is the shape information of the target member which is acquired based on the information measured by the sensor 20 at a given point in time.

The coupling angle detection unit 306E detects the rotation angle calculated by the rotation angle calculation unit 310 as the coupling angle of the towing motor vehicle 1E at a given point in time.

(Operation of Towing Motor Vehicle 1E Using Coupling Angle Detection Device 30E According to Fifth Embodiment)

The operation of the towing motor vehicle 1E using the coupling angle detection device 30E according to the present embodiment will be described. As an example, a case will be described in which one target member 40-7 formed in a rectangular shape is installed on the towed vehicle 3. In the present embodiment, the rotation angle calculation unit 310 holds position information on a plurality of measurement point groups in the target member 40-7 measured by the sensor 20 when the coupling angle is 0°, as the shape information of the target member 40-7 in a case where the coupling angle between the towing vehicle 2 and the towed vehicle 3 is 0°.

During traveling of the towed motor vehicle 1E, the sensor 20 measures the distance to a plurality of measurement points in the object including the target member 40-7 positioned in the upper surface area of the towed vehicle 3 at prescribed time intervals. The sensor 20 extracts measurement information regarding the plurality of measurement points in the target member 40-7, and transmits such information to the coupling angle detection device 30E.

Figure 17:
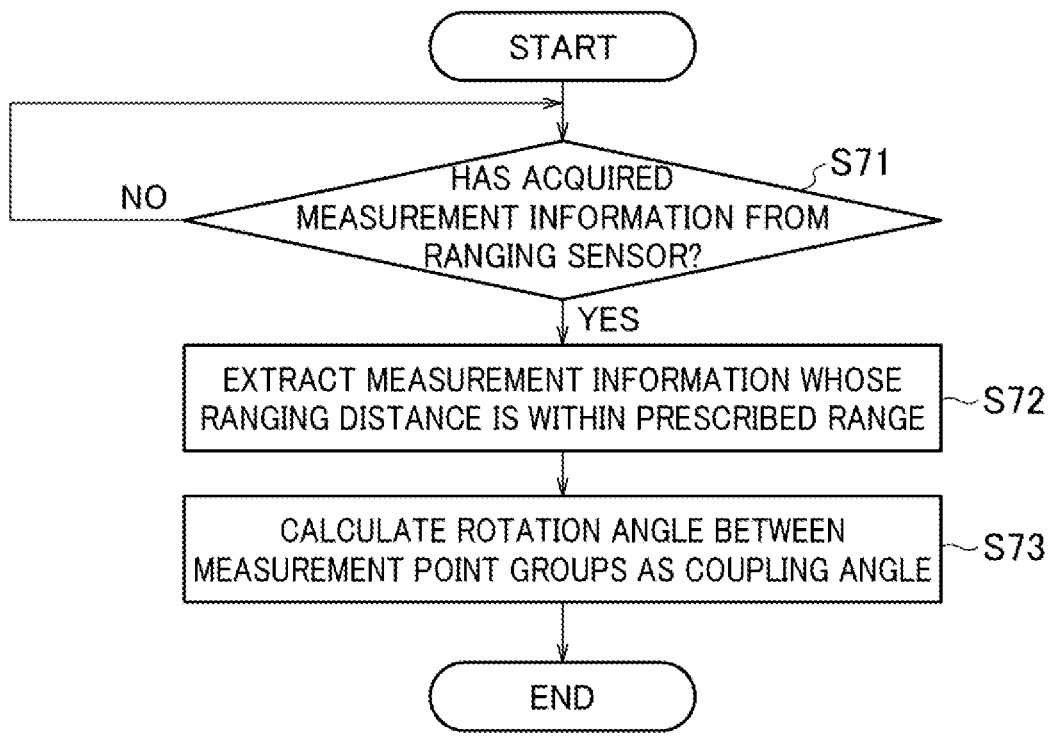
FIG. 17 is a flowchart illustrating a flow of coupling angle detection processing performed by the coupling angle detection device according to the fifth embodiment.

FIG. 17 is a flowchart illustrating a flow of coupling angle detection processing performed when the coupling angle detection device 30E acquires measurement information from the sensor 20. Since the processing of steps S71 and S72 in FIG. 17 is the same as the processing of steps S1 and S2 described in the first embodiment, a detailed description thereof will be omitted.

In step S72, when the filtering unit 302 extracts measurement information whose ranging distance is within a prescribed range through filtering processing, the processing proceeds to step S73. In step S73, the rotation angle calculation unit 310 calculates the rotation angle between the measurement point groups relative to the position of the sensor 20, based on the measurement information extracted by filtering processing and the position information on a plurality of measurement point groups in the target member 40-7 held in advance. For example, the rotation angle calculation unit 310 can use an ICP (iterative closest point) algorithm for calculation processing of the rotation angle between the measurement point groups.

Figure 18:
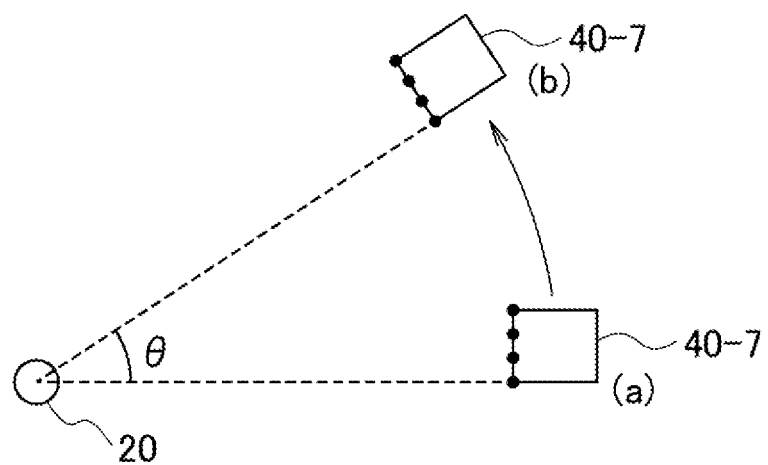
FIG. 18 is an explanatory diagram illustrating a coupling angle detected by the coupling angle detection device according to the fifth embodiment.

In FIG. 18, the position of the target member 40-7 when the coupling angle between the towing vehicle 2 and the towed vehicle 3 is 0° is illustrated in (a), and the position of the target member 40-7 at a given point in time during travelling is illustrated in (b). At this time, the rotation angle calculation unit 310 calculates the rotation angle $\theta$ between the measurement point group when the target member 40-7 is in the position (a) and the measurement point group when the target member 40-7 is in the position (b), based on the position of the sensor 20.

Next, the coupling angle detection unit 306E detects the rotation angle $\theta$ between the measurement point groups calculated by the rotation angle calculation unit 310, as the coupling angle of the towing motor vehicle 1E (S73).

According to the fifth embodiment, the sensor 20 installed in the towing vehicle 2 of the towing motor vehicle 1E measures the rotation state of the target member 40-7 installed in the towed vehicle 3. For this reason, the coupling angle between the towing vehicle 2 and the towed vehicle 3 can be accurately detected with simpler processing than that of the first embodiment.

In the first to fifth embodiments described above, the case has been described in which the target member is installed in the towed vehicle 3 and the sensor 20 is installed in the towing vehicle 2. However, the present disclosure is not limited thereto. For example, the target member may be installed in the towing vehicle 2 and the sensor 20 may be installed in the towed vehicle 3 so as to perform the same processing as in the respective embodiments.

Although some embodiments have been described, the embodiments may be changed or modified based on the above disclosure. All of the components of the above embodiments and all of the features described within the scope of the claims may be extracted and combined individually, provided they are not mutually inconsistent.

What is claimed is:

1. A coupling angle detection device for a combination vehicle including a first vehicle and a second vehicle coupled to the first vehicle, the coupling angle detection device comprising:

a target member having a prescribed shape and installed in the first vehicle;

a shape information acquisition unit installed in the second vehicle and configured to acquire a shape information of the target member; and a coupling angle detection unit configured to hold in advance, information indicating a front-rear direction of a vehicle body of the second vehicle, recognize a direction specified based on a prescribed condition from the shape information of the target member acquired by the shape information acquisition unit, as a front-rear direction of a vehicle body of the first vehicle, and detect an angle formed by the front-rear direction of the vehicle body of the second vehicle that is held and the front-rear direction of the vehicle body of the first vehicle that is recognized, as a coupling angle between the first vehicle and the second vehicle, wherein the target member is installed in the first vehicle such that the direction specified based on the prescribed condition from the shape information by means of the coupling angle detection unit fits the front-rear direction of the vehicle body of the first vehicle.

2. The coupling angle detection device for a combination vehicle according to claim 1, wherein the target member includes plural entities each having a rectangular shape, the target member is installed such that each corner of the plural entities at the second vehicle side overlaps a line perpendicular to the front-rear direction of the vehicle body of the first vehicle on a plane parallel to a traveling surface of the first vehicle, and the coupling angle detection unit is configured to detect each of the corners from the shape information of each of the plural entities and recognize a direction perpendicular to a straight line connecting each of the detected corners as the front-rear direction of the vehicle body of the first vehicle, thereby detecting the coupling angle.

3. The coupling angle detection device for a combination vehicle according to claim 1, wherein the target member has a long rectangular shape, the target member is installed in the first vehicle such that a long side of the target member overlaps a line perpendicular to the front-rear direction of the vehicle body of the first vehicle on a plane parallel to a traveling surface of the first vehicle, and the coupling angle detection unit is configured to detect the long side from the shape information of the target member and recognize a direction perpendicular to the detected long side as the front-rear direction of the vehicle body of the first vehicle, thereby detecting the coupling angle.

4. The coupling angle detection device for a combination vehicle according to claim 1, wherein the target member has a rectangular shape, the target member is installed in the first vehicle such that one side of the target member overlaps a line perpendicular to the front-rear direction of the vehicle body of the first vehicle on a plane parallel to a traveling surface of the first vehicle, and the coupling angle detection unit is configured to detect the one side from the shape information of the target member and recognize a direction specified based on a position and a direction of the detected one side as the front-rear direction of the vehicle body of the first vehicle, thereby detecting the coupling angle.

5. The coupling angle detection device for a combination vehicle according to claim 1, wherein the target member includes plural entities each having a circular shape, the target member is installed such that each center position of circles of the plural entities overlaps a line perpendicular to the front-rear direction of the vehicle body of the first vehicle on a plane parallel to a traveling surface of the first vehicle, and the coupling angle detection unit is configured to detect each center position of the circles from the shape information of each of the plural entities and recognize a direction perpendicular to a straight line connecting each of the detected center positions as the front-rear direction of the vehicle body of the first vehicle, thereby detecting the coupling angle.

6. A combination vehicle comprising:

a coupling angle detection device for a combination vehicle according to claim 1; and an automatic driving control unit configured to cause an own vehicle to drive automatically, and change contents of automatic driving when the coupling angle detected by the coupling angle detection device has reached a prescribed value or more.

7. A combination vehicle comprising:

a coupling angle detection device for a combination vehicle according to claim 1; and a notification information output unit configured to output information for notifying a driver that the coupling angle of an own vehicle has reached a prescribed value or more when detecting that the coupling angle detected by the coupling angle detection device has reached a prescribed value or more.

8. A coupling angle detection device for a combination vehicle including a first vehicle and a second vehicle coupled to the first vehicle, the coupling angle detection device comprising:

a target member having a prescribed shape and installed in the first vehicle;

a shape information acquisition unit installed in the second vehicle and configured to acquire a shape information of the target member;

a rotation angle calculation unit configured to hold in advance, the shape information of the target member acquired by the shape information acquisition unit when a coupling angle between the first vehicle and the second vehicle is 0°, as a first shape information, acquire the shape information of the target member acquired by the shape information acquisition unit at a given point in time as a second shape information, and calculate a rotation angle between the first shape information and the second shape information based on a position of the shape information acquisition unit; and a coupling angle detection unit configured to detect a rotation angle calculated by the rotation angle calculation unit, as a coupling angle between the first vehicle and the second vehicle at the given point in time.

9. A coupling angle detection method for a combination vehicle including a first vehicle in which a target member having a prescribed shape is installed and a second vehicle coupled to the first vehicle and in which a shape information acquisition unit configured to acquire a shape information of the target member is installed, the combination vehicle in which the target member is installed being such that a direction specified based on a prescribed condition from the shape information fits a front-rear direction of a vehicle body of the first vehicle, the method comprising:

holding in advance, information indicating a front-rear direction of a vehicle body of the second vehicle;

recognizing a direction specified based on the prescribed condition from the shape information of the target member acquired by the shape information acquisition unit, as a front-rear direction of a vehicle body of the first vehicle; and detecting an angle formed by the front-rear direction of the vehicle body of the second vehicle that is held and the front-rear direction of the vehicle body of the first vehicle that is recognized, as a coupling angle between the first vehicle and the second vehicle.

* * * * *